US008121356B2

(12) United States Patent
Friedman et al.

(10) Patent No.: US 8,121,356 B2
(45) Date of Patent: Feb. 21, 2012

(54) LONG DISTANCE MULTIMODAL BIOMETRIC SYSTEM AND METHOD

(75) Inventors: Marc D. Friedman, Needham, MA (US); Nicholas A. Accomando, Hingham, MA (US); Faisal Bashir, Woburn, MA (US); Pablo Casaverde, Bedford, NH (US); Stephen F. Daly, Mason, NH (US); David J. Hitchcock, Watertown, MA (US); Romina Marie Johnson Jose, Waltham, MA (US); Tim McNerney, Newton, MA (US); David Muller, Boston, MA (US); Vladimir Ruzhitsky, Newton, MA (US); Yasunari Tosa, Arlington, MA (US); David Usher, Waltham, MA (US)

(73) Assignee: Identix Incorporated, Bloomington, MN (US)

( * ) Notice: Subject to any disclaimer, the term of this patent is extended or adjusted under 35 U.S.C. 154(b) by 694 days.

(21) Appl. No.: 12/208,328

(22) Filed: Sep. 10, 2008

(65) Prior Publication Data

US 2010/0290668 A1 Nov. 18, 2010

Related U.S. Application Data

(63) Continuation-in-part of application No. 11/898,188, filed on Sep. 10, 2007.

(60) Provisional application No. 60/844,644, filed on Sep. 15, 2006, provisional application No. 60/935,973, filed on Sep. 10, 2007, provisional application No. 60/935,971, filed on Sep. 10, 2007, provisional application No. 60/987,925, filed on Nov. 14, 2007, provisional application No. 61/035,879, filed on Mar. 12, 2008.

(51) Int. Cl.
*G06K 9/00* (2006.01)
*H04N 7/18* (2006.01)
(52) U.S. Cl. .......................... 382/115; 382/103; 348/143
(58) Field of Classification Search .................. 382/103, 382/115–127; 348/135–161
See application file for complete search history.

(56) References Cited

U.S. PATENT DOCUMENTS 3,069,654 A 12/1962 Hough .......................... 382/281
(Continued)

FOREIGN PATENT DOCUMENTS
WO WO 2005/008567 1/2005

OTHER PUBLICATIONS

Fancourt et al. "Iris Recognition at a Distance." Audio- and Video-based Biometric Person Authentication; (Lecture Notes in Computer Science; LNCS), Springer-Verlag, Berlin/Heidelberg, pp. 1-13; XP019013243; ISBN: 978-3-540-27887-0; Jun. 28, 2005.

(Continued)

*Primary Examiner* — Manav Seth
(74) *Attorney, Agent, or Firm* — Nixon Peabody LLP

(57) ABSTRACT

A system for multimodal biometric identification has a first imaging system that detects one or more subjects in a first field of view, including a targeted subject having a first biometric characteristic and a second biometric characteristic; a second imaging system that captures a first image of the first biometric characteristic according to first photons, where the first biometric characteristic is positioned in a second field of view smaller than the first field of view, and the first image includes first data for biometric identification; a third imaging system that captures a second image of the second biometric characteristic according to second photons, where the second biometric characteristic is positioned in a third field of view which is smaller than the first and second fields of view, and the second image includes second data for biometric identification. At least one active illumination source emits the second photons.

81 Claims, 14 Drawing Sheets

U.S. PATENT DOCUMENTS

| | | | |
|---|---|---|---|
| 4,641,349 A | 2/1987 | Flom et al. | 382/117 |
| 5,291,560 A | 3/1994 | Daugman | 382/117 |
| 5,572,596 A | 11/1996 | Wildes et al. | 382/117 |
| 5,729,619 A * | 3/1998 | Puma | 382/115 |
| 5,751,836 A | 5/1998 | Wildes et al. | 382/117 |
| 5,836,872 A | 11/1998 | Kenet et al. | 600/306 |
| 5,859,686 A | 1/1999 | Aboutalib et al. | 351/209 |
| 5,953,440 A | 9/1999 | Zhang et al. | 382/117 |
| 5,991,429 A * | 11/1999 | Coffin et al. | 382/118 |
| 6,011,624 A | 1/2000 | De Groot | 356/511 |
| 6,144,754 A | 11/2000 | Okano et al. | 382/117 |
| 6,152,563 A | 11/2000 | Hutchinson et al. | 351/209 |
| 6,208,379 B1 * | 3/2001 | Oya et al. | 348/211.11 |
| 6,215,891 B1 | 4/2001 | Suzaki et al. | 382/117 |
| 6,229,907 B1 | 5/2001 | Okano et al. | 382/117 |
| 6,247,813 B1 | 6/2001 | Kim et al. | 351/206 |
| 6,285,780 B1 | 9/2001 | Yamakita et al. | 382/110 |
| 6,373,968 B2 | 4/2002 | Okano et al. | 382/117 |
| 6,442,465 B2 | 8/2002 | Breed et al. | 701/45 |
| 6,526,160 B1 | 2/2003 | Ito | 382/117 |
| 6,526,161 B1 | 2/2003 | Yan | 382/118 |
| 6,529,630 B1 | 3/2003 | Kinjo | 382/190 |
| 6,532,298 B1 | 3/2003 | Cambier et al. | 382/117 |
| 6,542,624 B1 | 4/2003 | Oda | 382/117 |
| 6,546,121 B1 | 4/2003 | Oda | 382/117 |
| 6,571,002 B1 | 5/2003 | Ogawa | 382/117 |
| 6,591,064 B2 | 7/2003 | Higashiyama et al. | 396/18 |
| 6,597,377 B1 | 7/2003 | MacPhail | 715/738 |
| 6,614,919 B1 | 9/2003 | Suzaki et al. | 382/117 |
| 6,700,998 B1 | 3/2004 | Murata | 382/117 |
| 6,714,665 B1 | 3/2004 | Hanna et al. | 382/117 |
| 6,753,919 B1 | 6/2004 | Daugman | 348/345 |
| 6,760,467 B1 | 7/2004 | Min et al. | 382/117 |
| 6,778,698 B1 | 8/2004 | Prakash et al. | 382/164 |
| 6,785,406 B1 | 8/2004 | Kamada | 382/117 |
| 6,850,631 B1 | 2/2005 | Oda et al. | 382/117 |
| 6,944,318 B1 | 9/2005 | Takata et al. | 382/115 |
| 6,992,717 B2 | 1/2006 | Hatano | 348/333 |
| 7,099,495 B2 | 8/2006 | Kodno et al. | 382/117 |
| 7,155,035 B2 | 12/2006 | Kondo et al. | 382/117 |
| 7,197,166 B2 | 3/2007 | Jeng | 382/118 |
| 7,227,569 B2 * | 6/2007 | Maruya | 348/143 |
| 7,277,561 B2 | 10/2007 | Shin | 382/117 |
| 7,421,097 B2 * | 9/2008 | Hamza et al. | 382/118 |
| 7,428,314 B2 * | 9/2008 | Henson | 382/103 |
| 7,715,595 B2 * | 5/2010 | Kim et al. | 382/117 |
| 2003/0012413 A1 | 1/2003 | Kusakari et al. | 382/117 |
| 2003/0020828 A1 | 1/2003 | Ooi et al. | 348/371 |
| 2003/0085992 A1 * | 5/2003 | Arpa et al. | 348/47 |
| 2003/0103139 A1 * | 6/2003 | Pretzer et al. | 348/143 |
| 2003/0108224 A1 | 6/2003 | Ike | 382/117 |
| 2003/0118217 A1 | 6/2003 | Kondo et al. | 382/117 |
| 2004/0197011 A1 | 10/2004 | Camus et al. | 382/103 |
| 2004/0227693 A1 | 11/2004 | Rambo et al. | 345/6 |
| 2005/0078868 A1 | 4/2005 | Chen et al. | 382/171 |
| 2005/0084179 A1 | 4/2005 | Hanna et al. | 382/294 |
| 2005/0251347 A1 | 11/2005 | Perona et al. | 702/19 |
| 2006/0008124 A1 | 1/2006 | Ewe et al. | 382/117 |
| 2006/0140453 A1 | 6/2006 | Geng | 382/115 |
| 2006/0140454 A1 | 6/2006 | Northcott et al. | 382/117 |
| 2006/0147094 A1 | 7/2006 | Yoo | 382/117 |
| 2006/0165266 A1 | 7/2006 | Hamza | 382/117 |
| 2006/0187305 A1 | 8/2006 | Trivedi et al. | 348/169 |
| 2007/0036397 A1 | 2/2007 | Hamza | 382/117 |
| 2007/0047772 A1 | 3/2007 | Matey et al. | 382/117 |
| 2007/0047773 A1 | 3/2007 | Martin et al. | 382/117 |
| 2007/0110284 A1 | 5/2007 | Rieul et al. | 382/117 |
| 2007/0160266 A1 | 7/2007 | Jones et al. | 382/117 |
| 2007/0160267 A1 | 7/2007 | Jones et al. | 382/117 |
| 2008/0075334 A1 * | 3/2008 | Determan et al. | 382/117 |
| 2008/0112596 A1 * | 5/2008 | Rhoads et al. | 382/115 |
| 2010/0183199 A1 * | 7/2010 | Smith et al. | 382/117 |

OTHER PUBLICATIONS

Guo et al. "A System for Automatic Iris Capturing." Mitsubishi Electric Research Laboratories, TR2005-044, Dec. 2005 (9 pages).

Liao et al. "A Fast Algorithm for Multilevel Thresholding." Journal of Information Science and Engineering 17, pp. 713-727 (2001).

Libor Masek. "Recognition of Human Iris Patterns for Biometric Identification." School of Computer Science and Software Engineering, The University of Western Australia, 2003, pp. 1-56 (61 pages).

Liu et al. "Experiments with an Improved Iris Segmentation Algorithm." Department of Computer Science and Engineering University of Notre Dame. Fourth IEEE Workshop on Automatic Identification Advanced Technologies (AutoID), Oct. 2005, New York (6 pages).

Nobuyuki Otsu. "A Threshold Selection Method from Gray-Level Histograms." IEEE Transactions on Systems, Man and Cybernetics. vol. SMC-9, No. 1, Jan. 1979 (5 pages).

Park et al. "A Fast Circular Edge Detector for the Iris Region Segmentation." S.-W. Lee, H.H. Buelthoff, T. Poggio (Eds.): BMCV 2000, LNCS 1811, pp. 417-423, 2000 (7 pages).

Ross et al. "Handbook of Multibiometrics." Springer Science, New York, U.S. XP002597965 ISBN: 978-0-387-22296-7; p. 51; Jun. 24, 2006.

Tisse et al. "Person Identification Technique Using Human Iris Recognition." Advanced System Technology; Universite de Montpellier (6 pages).

Wang et al. "Combining Face and Iris Biometrics for Identity Verification." Proceedings of Fourth International Conference on AVBPA, Guildford, UK, 2003, pp. 805-813 (8 pages).

European Search Report corresponding to European Patent Application U.S. Appl. No. 07842181, European Patent Office, dated Aug. 27, 2010, 7 pages.

International Search Report for PCT/US08/75910, dated Nov. 28, 2008, 3 pages.

Written Opinion for PCT/US08/75910, dated Nov. 28, 2008, 9 pages.

International Search Report for PCT/US07/078074, dated Mar. 12, 2008, 3 pages.

* cited by examiner

LONG DISTANCE MULTIMODAL BIOMETRIC SYSTEM AND METHOD

CROSS REFERENCE TO RELATED APPLICATIONS

This application is a Continuation-In-Part (CIP) Application of U.S. application Ser. No. 11/898,188, filed Sep. 10, 2007, which claims priority to U.S. Provisional Application No. 60/844,644 filed Sep. 15, 2006, and claims priority to U.S. Provisional Application No. 60/935,973, filed Sep. 10, 2007, U.S. Provisional Application No. 60/935,971, filed Sep. 10, 2007, U.S. Provisional Application No. 60/987,925, filed Nov. 14, 2007, and U.S. Provisional Application No. 61/035,879, filed Mar. 12, 2008, the contents of these applications being incorporated herein by reference.

BACKGROUND OF INVENTION

1. Field of Invention

The present invention relates generally to systems and methods for biometric identification, and more particularly, to imaging systems and methods capable of biometric identification according to more than one modality, especially for subjects positioned at a long distance from the image capture system.

2. Description of the Related Art

Humans possess multiple biometric characteristics which may be used for identification and access control applications. A criticism of existing biometric technologies has been that biometric acquisition procedures are often cumbersome and intrusive. For example, fingerprint biometrics offers an accurate solution, but acquisition of fingerprints typically requires contact (or near contact) with finger-print sensors. As such, finger-print biometrics is generally not scalable in terms of acquisition parameters, such as stand-off distance and capture volume. On the other hand, facial biometrics is advantageous because the face is generally in plain view and thus acquisition of corresponding biometric data tends to suffer from fewer constraints and may be less intrusive. However, facial biometrics is less accurate than other techniques, such as fingerprint biometrics.

As a result, an active area of research and development aims to improve biometric system design to facilitate acquisition and reduce intrusiveness. In particular, iris biometrics has spawned a great deal of research and development in recent years. Iris biometrics, however, has not yet become ubiquitous as compared to biometrics based on the face or finger-prints. Iris biometrics may be less intrusive than fingerprint biometrics and has been shown to be one of the most accurate biometrics, even exceeding the accuracy of finger-print biometrics. However, due to the smaller dimensions of the iris, acquisition of iris biometrics from a distance imposes more design challenges than the acquisition of facial biometrics at a distance. Challenges associated with iris acquisition systems stem largely from two requirements: (1) active NIR illumination and (2) pixel and spatial resolution. Firstly, standards dictate that NIR illumination be used as it has been found to emphasize iris textures while providing contrast between the iris and both the sclera and pupil. Secondly, the dimensions of the iris are such that iris recognition technologies require signification pixel and spatial resolutions in order to encapsulate enough biometric data. The Iris Image Interchange Format (ANSI INCITS 379-2004) specifies a lower limit of 100 pixels for the number of pixels across the iris region and sets a lower spatial resolution limit for two line pairs-per-mm at 60% contrast or higher.

Commercially available iris acquisition systems meet illumination and resolution requirements by imposing significant constraints on subjects during acquisition. Constraints imposed on parameters such as stand-off distance, capture volume, and subject motion account for some of the disadvantages of existing iris acquisition systems. Relaxation of these constraints cannot be achieved without a more demanding system design. For example, some system designs require subjects to pass through a portal type gate or by a glance-and-go type system during acquisition. These types of systems may provide larger stand-off distances (e.g., approximately 1-3 meters) and capture volumes (e.g., approximately 0.2 m×0.1 m×0.2 m). Such systems, however, are not scalable in terms of distance. In other words, it becomes more difficult to acquire iris images for biometric identification as the distance between the imaging system and the target increases. Furthermore, the constraints of commercially available iris acquisition systems prevent these systems from acquiring and tracking a person among multiple persons within a specified field of view from a distance. As a further disadvantage, such systems usually image one iris at a time and not two eyes simultaneously, or near simultaneously.

In addition, like other commercially available biometric systems, traditional iris acquisition systems are typically limited to a single biometric modality. In other words, such systems only acquire and process images of the iris. These single modal systems suffer from the limitations inherent in iris-only imaging systems and fail to take advantage of other techniques for biometric acquisition. In particular, although video surveillance technologies are also advancing to new levels of maturity, it has been observed that the technologies for identity tracking through biometrics and location tracking through intelligent video surveillance are evolving in isolation.

SUMMARY OF THE INVENTION

In view of the limitations of the iris acquisition systems described previously, embodiments of the present invention provide a biometric system that is combined with aspects of video surveillance technologies. In particular, embodiments may include an iris acquisition system providing high matching performance and an acquisition process with fewer constraints. Additionally, these embodiments may provide large area situational awareness through aspects of video surveillance, which enables a biometric system to be scalable in terms of acquisition constraints. In general, embodiments provide a biometric system for capturing and combining biometric information from more than one modality. For example, embodiments may provide multimodal approaches that generate and process images from the face and the two irises of subjects.

Advantageously, the embodiments provide multimodal systems that can capture biometric data from subjects who are positioned at a distance from the system. For instance, a multimodal biometric system may capture and process images of the face and both irises of subjects who are fifty meters away from the system. As such, the system resolves issues associated with stand-off distance, capture volume and subject motion while providing a scalable design.

In one embodiment, a system for multimodal biometric identification includes a first imaging system that detects one or more subjects in a first field of view, where the one or more subjects includes a targeted subject having a first biometric characteristic and a second biometric characteristic. In addition, the system includes a second imaging system that captures a first image of the first biometric characteristic according to first photons reflecting from the first biometric characteristic, where the first biometric characteristic is positioned in a second field of view which is smaller than the first field of view, and the first image includes first data for biometric identification. Furthermore, the system includes a third imaging system that captures a second image of the second biometric characteristic according to second photons reflecting from the second biometric characteristic, where the second biometric characteristic is positioned in a third field of view which is smaller than the first and second fields of view, and the second image includes second data for biometric identification. At least one active illumination source emits the second photons to be reflected from the second biometric characteristic. A controller operates the first imaging system, the second imaging system, the third imaging system, and the at least one illumination source according to programmed instructions. The controller includes at least one or more independent sub-controllers and/or one or more interdependent sub-controllers. In particular embodiments, the first biometric characteristic may be a face and the second biometric characteristic may be at least one iris corresponding to an eye of the targeted subject.

In yet another embodiment, a method for multimodal biometric identification includes: identifying one or more subjects in a first field of view; selecting a targeted subject from the one or more subjects, where the targeted subject has a first biometric characteristic and a second biometric characteristic; aligning a second field of view to the first biometric characteristic, where the second field of view is smaller than the first field of view; aligning a third field of view to the second biometric characteristic, where the third field of view is smaller than the first field of view and the second field of view; actively illuminating with second photons the second biometric characteristic; capturing a first image of the first biometric characteristic according to first photons, where the first image includes first data for biometric identification; and capturing a second image of the second biometric characteristic according to the second photons, where the second image includes second data for biometric identification.

Embodiments according to aspects of the present invention may employ subject tracking, face tracking and recognition, iris tracking from facial tracking and recognition, iris image capture, high speed iris image processing, optimal optics and illumination design, as well as compliance with applicable safety and technology standards.

In a further embodiment, a system for capturing biometric data from a subject includes a first imaging system having a first field of view and capturing at least one first image in which a subject is detected, a second imaging system having a second field of view, and a third imaging system having a third field of view. The system also includes an adjustment system coupled to the second imaging system and the third imaging system, the adjustment system being movable according to a position of the subject detected in the first field of view, where movement of the adjustment system causes the subject to be positioned in at least one of the second field of view and the third field of view. The second imaging system captures at least one second image from the subject when the subject is positioned in the second field of view, and the third imaging system captures at least one third image from the subject when the subject is positioned in the third field of view. The at least one third image is determined from the at least one second image and provides biometric data for the subject.

In another embodiment, a system for capturing biometric data a subject includes a first imaging system capturing at least one first image and detecting a subject, a second imaging system being movable to track the subject and capturing at least one facial image from the subject, and a third imaging system including dual sensors. The third imaging system determines a position of the subject's eyes in the at least one facial image and the dual sensors capturing eye images from the subject, where the eye images contain biometric data.

In yet another embodiment, a method for determining biometric data from one or more subjects includes receiving a plurality of scene images from a first field of view, each scene image including a background image and a foreground image, the foreground image containing one or more subject images, the one or more subject images including eye images having biometric data corresponding to one or more subjects; detecting, in each scene image, the foreground image relative to the background image; detecting, in each scene image, the one or more subject images in the foreground image; detecting facial images corresponding to the one or more subject images; tracking, in the plurality of scene images, the detected facial images corresponding to the one or more subject images; scheduling the tracked facial images for acquisition of the biometric data; directing a second field of view to the tracked facial images according to the act of scheduling; receiving the tracked facial images from the second field of view; locating the eye images in the tracked facial images from the second field of view; receiving the located eye images from a third field of view; and detecting the biometric data in the detected eye images from the third field of view. A further embodiment provides a product that includes a machine-readable medium containing instructions for determining biometric data from one or more subjects, where the instructions include the acts in this method.

These and other aspects of the present invention will become more apparent from the following detailed description of the preferred embodiments of the present invention when viewed in conjunction with the accompanying drawings.

DETAILED DESCRIPTION

Figure 1:
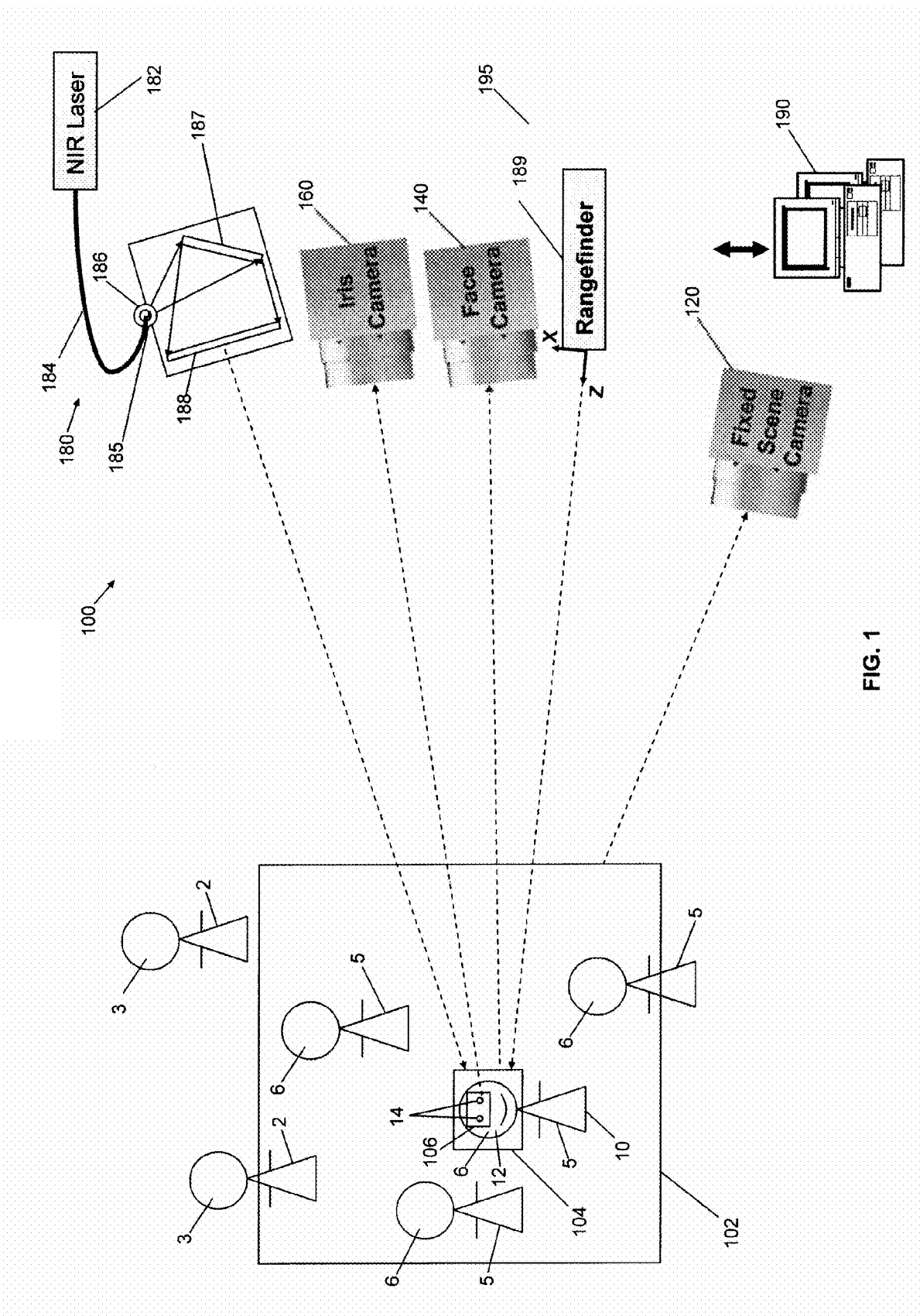
FIG. 1 illustrates a system that captures and processes biometric data from a subject's face and two irises according to aspects of the present invention.

Referring to FIG. 1, an embodiment of a biometric system 100 employing more than one modality is illustrated. In particular, the multimodal biometric system 100 includes three imaging systems. The first imaging system is a scene imaging system 120 for identifying one or more subjects for biometric identification from a distance. The second imaging system is a face imaging system 140 for capturing images of the face 12 of a target subject 10 from a distance. The third imaging system is an iris imaging system 160 for capturing images of each iris 14 of the target subject 10 from a distance. In some embodiments, the imaging systems 120, 140, and 160 as well as other components may be housed in a single image capture device, but the components of the biometric system 100 may house the components in any number of combinations and any number of devices.

The scene imaging system 120 may include one or more cameras that capture images based on photons with visible, near-infrared (NIR), or infrared (IR) wavelengths. The visible wavelengths detected may be in a range of approximately 400 nm to 700 nm; the NIR wavelengths detected may be in a range of approximately 700 nm to 2 µm; and the IR wavelengths detected may be in a range of approximately 2 µm to 13 µm. In some embodiments, the scene imaging system 120 captures images through passive imaging. Passive imaging refers to the detection of photons that are initially emitted from a source external to the biometric system 100, also referred to as ambient photon generation. In certain indoor or outdoor scenarios, passive imaging by the scene imaging system 120 may detect photons with visible, NIR, and/or IR wavelengths. For example, the biometric system 100 may be used to check subjects attending a large sporting event or similar public gathering, where the ambient lighting at the venue generates a sufficient level of photons with visible wavelengths for detection by the scene imaging system 120. In other embodiments, however, the scene imaging system 120 may detect photons that are provided by an illumination source (not shown) controlled by the biometric system 100, i.e., active illumination. The illumination provided may be of visible, NIR, and/or IR wavelengths.

The face imaging system 140 may include a camera that captures images of the face based on photons with visible, NIR, or IR wavelengths. The visible wavelengths detected may be in a range of approximately 400 nm to 700 nm; the NIR wavelengths detected may be in a range of approximately 700 nm to 2 µm; and the IR wavelengths detected may be in a range of approximately 2 µm to 13 µm. In some embodiments, the face imaging system 140 may employ passive imaging to detect photons with visible, NIR, or IR wavelengths. In other embodiments, the face imaging system 140 may detect photons that are provided by an illumination source controlled by the biometric system 100, i.e., active illumination with visible, NIR, and/or IR wavelengths.

The iris imaging system 160 may include a camera that captures iris images based on photons with visible or NIR wavelengths. Photons with visible or NIR wavelengths may be used for iris recognition if the iris sensor is sufficiently large and an adequately high resolution is employed. The visible wavelengths detected may have a range of approximately 400 nm to 700 nm. The NIR wavelengths detected may be in a range of approximately 700 nm to 2 µm, or preferably, a range of 700 nm to 950 nm. The preferable range may generally be determined according to the existing Iris Image Interchange Format standard (ANSI INCITS 379-2004).

The iris sensor of the iris imaging system 160 may have a significantly higher magnification than the face sensor of the face imaging system 140. In some embodiments, commercially available sensors may be employed, where the sensors, for example, employ 752×480 pixels for each eye image, have a resolution in the range of approximately 16 to 21 pixels/mm, and have a quantum efficiency of approximately 25 to 30 percent at 850 nm illumination.

Figure 5:
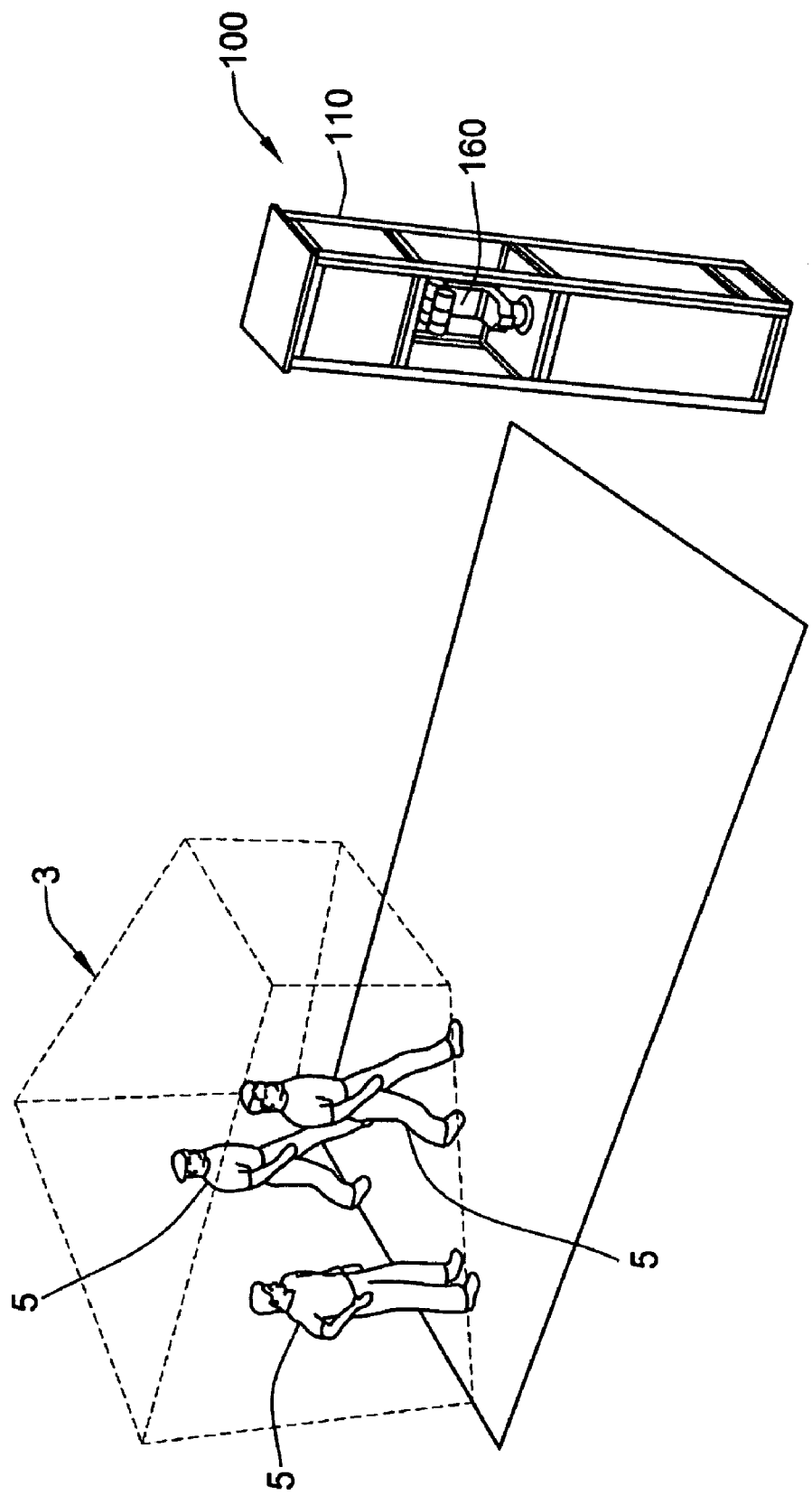
FIG. 5 illustrates a capture volume for a system that captures and processes biometric data from FIG. 6 illustrates an embodiment of a system that captures and processes biometric data from a subject's face and two irises according to aspects of the present invention.

FIG. 5 illustrates an example of a biometric system 100 disposed within a standing unit 110. FIG. 5 also shows an example of a capture volume 3 positioned in relation to the biometric system 100. The biometric system 100 captures images of the subjects 5 that are within or passing through the capture volume 3. In this case, the optical design of the iris imaging system 160 may employ a long focal length zoom lens having an aperture of approximately 100 mm for a stand-off distance of approximately 3 m and a capture volume depth of approximately 3 m, thus providing the capture volume 3 of approximately 3 m to approximately 6 m. For other embodiments in which very long distances are involved, a zoom lens having an aperture of approximately 50 cm to approximately 100 cm for a stand-off distance of approximately 50 m may be employed. In particular, the telescope may have a Ritchey-Chrétien design, i.e. a hyperbolic Cassegrain telescope with a very flat field. In addition, the resolution may be 2 lp/mm to 4 lp/mm, thereby complying with the Iris Image Interchange Format standard. Meanwhile, the opto-mechanical requirements may be met with commercially available ultra-high precision axis encoders (resolutions <0.002 arc-sec).

Figure 3:
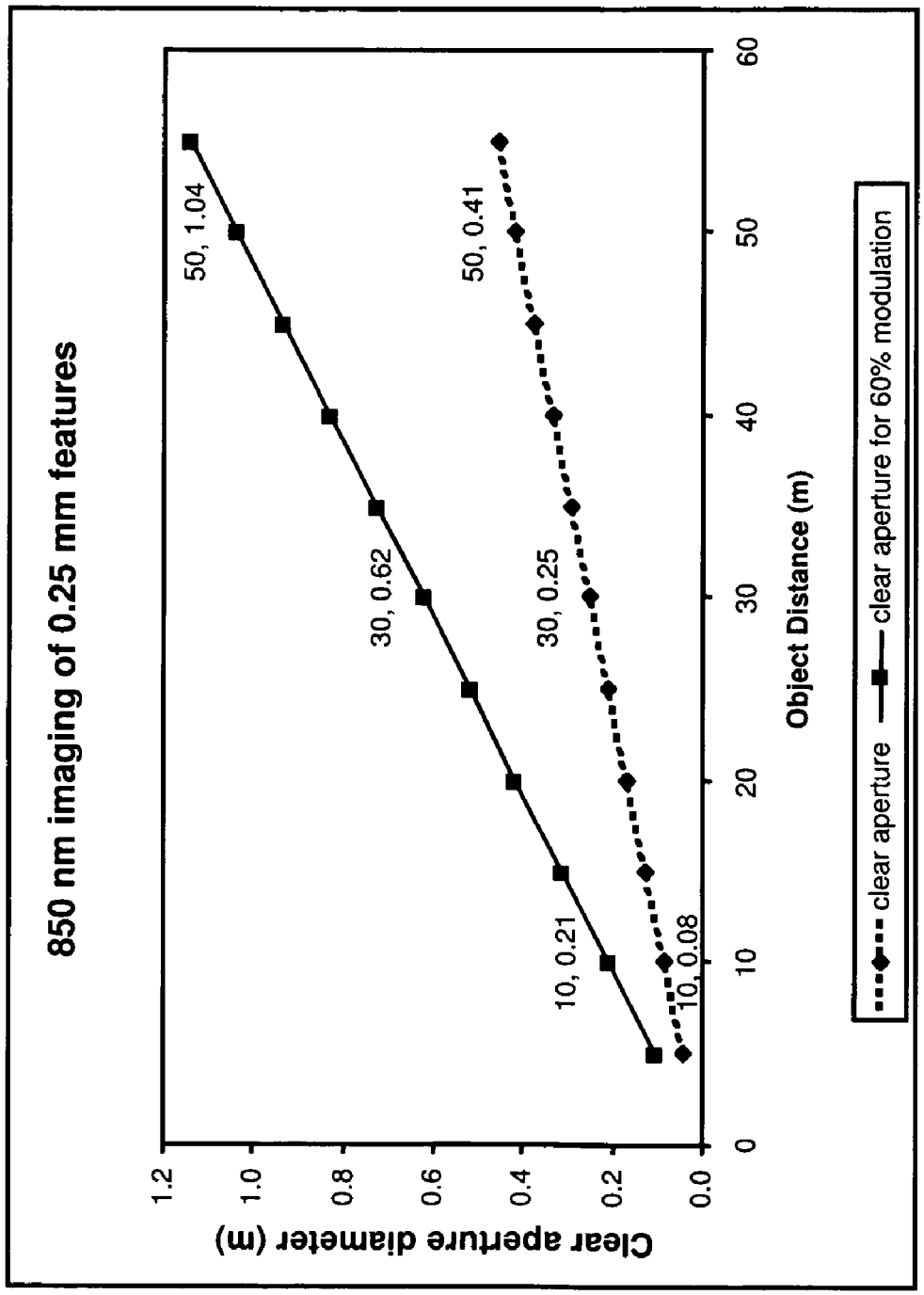
FIG. 3 illustrates the range of clear apertures required to resolve 0.25 mm with 850 nm illumination at varying object distances.
Figure 4:
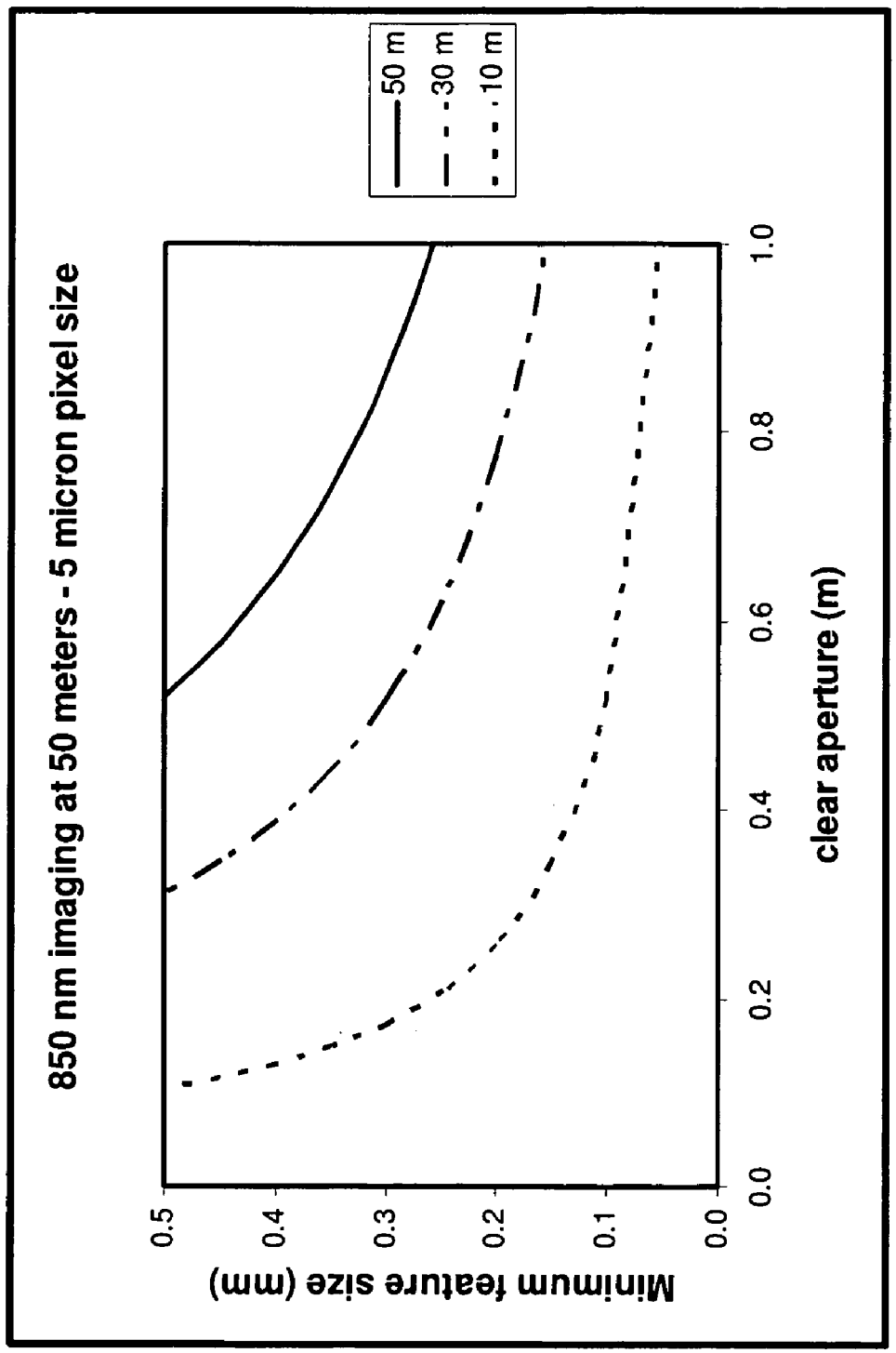
FIG. 4 illustrates the range of clear apertures versus minimum resolvable feature size.

To illustrate the ability of embodiments to resolve features at a distance, FIG. 3 illustrates the range of clear apertures required to resolve 0.25 mm with 850 nm illumination at varying object distances. In addition, FIG. 4 illustrates the range of clear apertures versus minimum resolvable feature size, particularly imaging with 850 nm illumination at 50 meters with 5 µm pixel size.

One or more illumination systems, such as the illumination system 180 in FIG. 1, may be employed for active illumination. In particular, the illumination system 180 may emit photons with NIR wavelengths which are reflected from the irises 14 of the subject 10 and subsequently detected by iris imaging system 160. As discussed previously, such illumination systems may also be used for active imaging by the face imaging system 140. As illustrated in FIG. 1, the illumination system 180 may employ an NIR laser source 182. Filters or coated optics may be employed in the optical train to select specific wavelengths, but still allow a visible color image. In a particular embodiment, for example, the illumination system 180 may have a wavelength of approximately 850 nm and a collimated beam with a spot size diameter of approximately 30 cm full width half-maximum (FWHM). In this embodiment, the laser illumination may be provided with an average power of approximately 1 W and a continuous wave with an irradiance of 2 mW/cm2 or less. Accordingly, referring to FIG. 1, an optical fiber 184 is coupled to the laser 182. The optical fiber 184 is positioned to direct photons to a rotating diffuser 185 rotating at approximately 1000 revolutions per minute. Rotation of the diffuser 185 helps reduce speckle of the illumination. A notch filter 186 may also be placed in line to minimize any visible illumination from the illumination system 180 that may alert people to the presence of the biometric system 100, especially when the biometric system 100 is intended to be used covertly, i.e. without the subjects' knowledge. As shown in FIG. 1, the illumination expands from the optical fiber 184 and is directed to a mirror 187. The illumination is reflected to a Fresnel lens 188 where it is collimated. The beam may be collimated or slightly diverging.

Alternatively, rather than providing continuous wave illumination as described previously, the laser may be pulsed at 50 nsec with a 10 kHz duty cycle. Advantageously, employing a quasi-CW laser reduces laser speckle.

Figure 6:
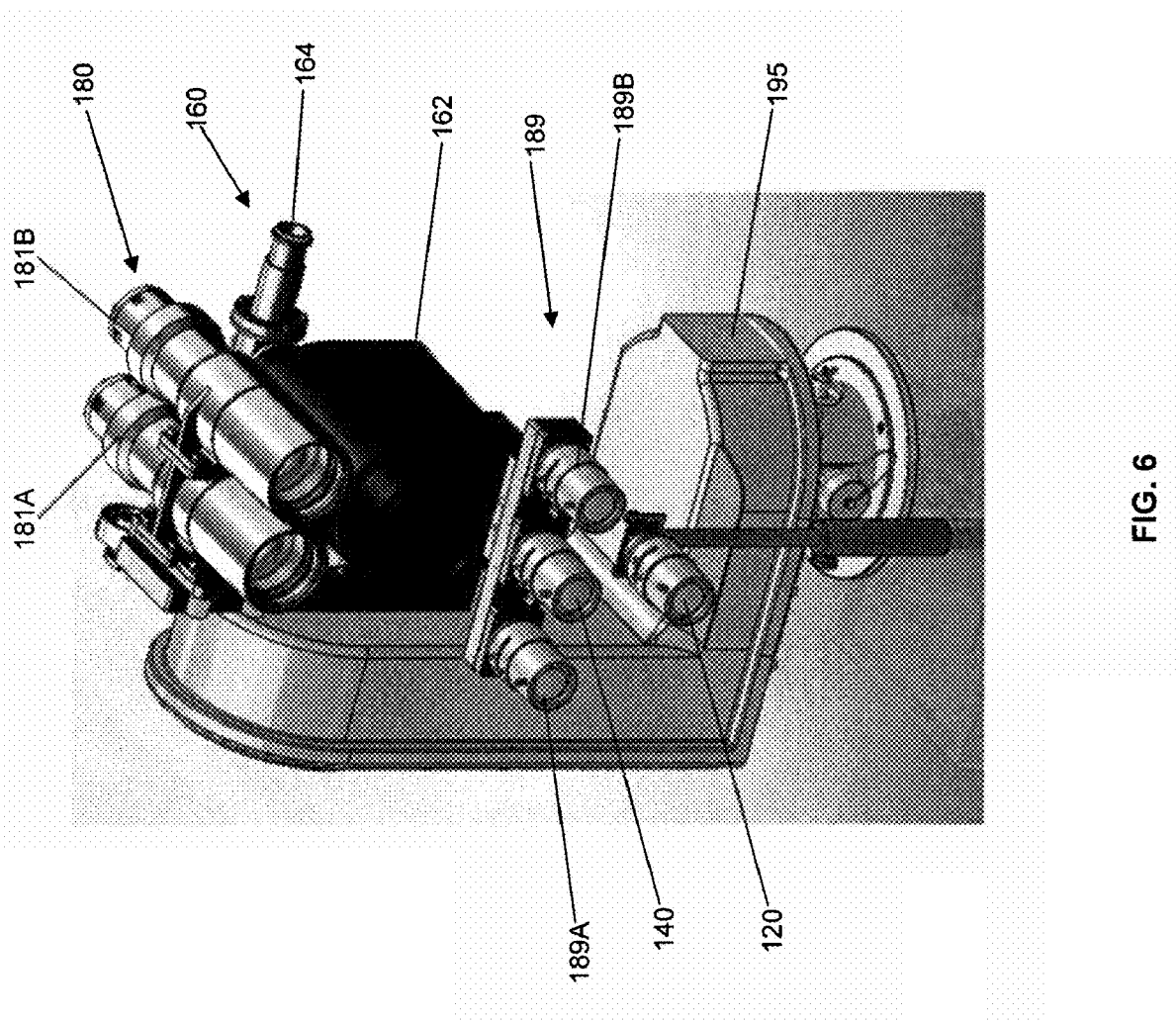

Referring to FIG. 6, an example embodiment of a biometric system 100 is illustrated. In particular, FIG. 6 shows the configuration of a camera for the scene imaging system 120, a camera for the face imaging system 140, and a lens 162 and sensors 164 for the iris imaging system 160. FIG. 6 also shows the illumination system 180 with two illumination sources 181A and 181B that are employed to illuminate each eye separately. In general, the illumination system 180 may include more than one illumination source.

As FIGS. 1 and 6 illustrates, the biometric system 100 may employ a rangefinder 189. In FIG. 6, the biometric system employs stereo cameras 189A and 189B. The rangefinder 189 may be used to detect the distance along the Z-axis from the rangefinder 189 to the targeted subject 10. This Z-distance is utilized to improve the accuracy of estimates of the (X, Y, Z) position of the targeted subject 10 as well as to determine the range of focus and zoom, for example, by the iris camera lens 162 of the iris imaging system 160. The Z-distance provides a value for a search for an image with the highest focus measure. The Z-distance information may also be utilized to predict the anticipated movement of the subject. In other embodiments, the rangefinder 189 may be an optical laser rangefinder with a wavelength, for example, of 904 nm, or may employ ultrasound rather than optical signals.

The lens 162 in the embodiment of FIG. 6 may include a long focal length zoom lens 162. As such, control hardware may also be employed to control the zoom and focus of the lens 162. In one embodiment, the control hardware may include a processor mounted on a printed circuit board (PCB) with firmware/software for flexible, simultaneous control of zoom and focus. The hardware and firmware/software may be adapted for operation of multiple and homogenous lens systems. In general, the rangefinder 189 is employed to determine a Z-distance. The zoom lens control unit moves the lens rapidly according to the Z-distance and then oscillates about this value through a motion governed by an amplitude A and a time period T. The zoom and focus of the lens are moved simultaneously.

Figure 9:
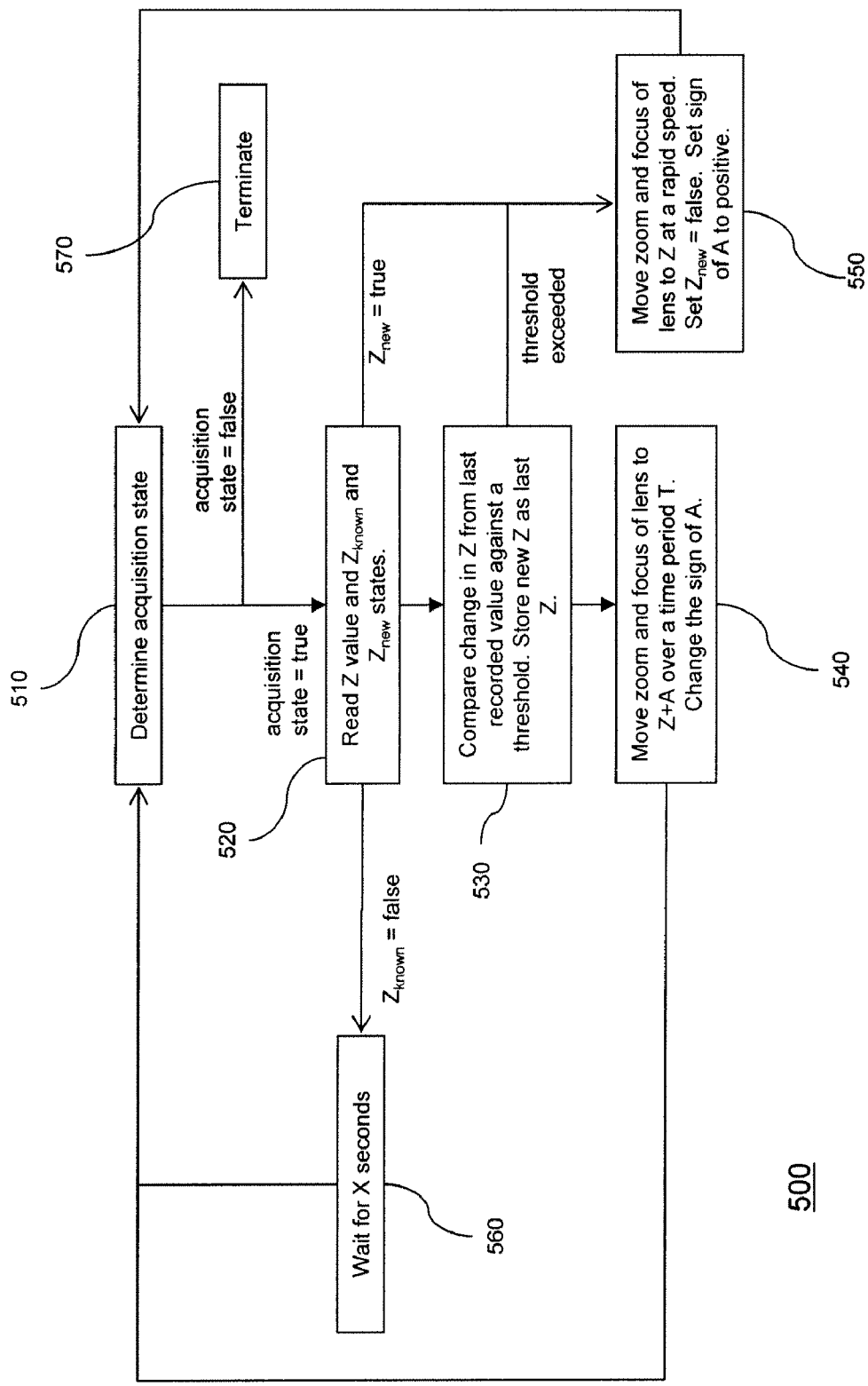
FIG. 9 illustrates a process for a controlling a zoom lens according to aspects of the present invention.

FIG. 9 illustrates a process 500 that may be employed by a zoom lens control unit. In act 510, the acquisition state is determined. If the acquisition state is false, the process terminates in act 570. The zoom lens control unit may employ two Boolean states, $Z_{new}$ and $Z_{known}$, indicating whether the Z-distance measured by the rangefinder 189 is new or known, respectively. If the acquisition state is true, the values of Z-distance, $Z_{new}$, and $Z_{known}$ are read in act 520. If $Z_{known}$ is false, the process waits for a period of time during act 560 before looping back to act 510. This wait period of time sets the frequency at which the process checks for a change in the value of $Z_{known}$. If $Z_{new}$ is true, the process 500 moves the zoom and focus of the zoom lens 162 to the Z-distance at a rapid speed during act 550. In act 550, $Z_{new}$ is also set to false and the sign of amplitude A is set to positive. The process 500 then loops back to act 510. If $Z_{known}$ is true and $Z_{new}$ is false, the difference between the current Z-distance and the last Z-distance is compared to a threshold in act 530. If the difference exceeds this threshold, the process 500 proceeds to act 550. The value of current Z-distance is then stored as the last Z-distance. If the threshold at act 530 is not exceeded, the process 500 proceeds to act 540 where the lens 162 is moved to a zoom and focus value of Z-distance plus amplitude A over at time period of T. When this movement is completed, the sign of amplitude A is changed and the process 500 loops back to act 510.

A zoom and focus control process may be employed for non-stationary subjects. This process predicts a location L where a subject will be in focus at some time T in the future, moves to location L in a time less than T, and waits for the subject to move through focus. This process also handles changes in direction. The rangefinder processing unit reads a Z-distance from the rangefinder 189 either at a fixed time interval or when an image is read from the face imaging system 140. When the Z-distance is recorded, a rangefinder model is executed. The rangefinder model determines the Z motion of a subject as the subject moves through the scene. The control process also employs the two Boolean states, $Z_{new}$ and $Z_{known}$. When each range reading is taken, the model first checks to see if the reading is within acceptable limits. If a series of unacceptable range readings sequentially occurs, then $Z_{known}$ is set to false. An inertia value of a certain time interval or reading counts is used. If an acceptable reading is measured and if $Z_{known}$ is false, it is reset to true and $Z_{new}$ is changed to true. Otherwise if $Z_{known}$ is currently true then a velocity is calculated using the new range reading and a previous cached history of readings.

As further illustrated in FIG. 1, the illumination source 180 may be integrated into a pan-tilt unit (PTU) 195. The PTU 195 may be controlled to direct photons to specific biometric features which are then captured by the iris imaging system 160 and possibly the face imaging system 140. Accordingly, in one embodiment, the illumination system 180 may be operated in burst mode triggered in coordination with the respective imaging system 140 or 160. The illumination source 180 may also be employed for range finding to achieve auto focusing by the respective imaging system 140 or 160, as described previously.

Furthermore, the PTU 195 may be used to target and track subjects. As shown in FIGS. 1 and 6, the illumination system 180, the camera of face imaging system 140, the camera of the iris imaging system 160, and the rangefinder 189 may all be mounted on the single PTU 195. The camera of the face imaging system 140, the camera of the iris image system 160, and the rangefinder 189 are oriented on the PTU 195 so that they receive photons from the illumination source 180 which are reflected from the targeted subject 10. Therefore, the PTU 195 may be controlled to steer the mounted systems to direct photons from the illumination system 180 and to permit the co-aligned imaging systems 140 or 160 to capture the photons reflected from the respective biometric feature, i.e., face or iris. The PTU 195 moves relative to the scene imaging system 120.

In some embodiments, one or more beam steering systems (not shown), as are known, may additionally or alternatively be employed to direct the photons which are detected by the imaging systems 120, 140, and 160 for image capture. The beam steering systems may include galvanometric mirrors and/or imaging optics positioned on a gimbal mount. The beam steering systems may direct photons from the illumination source 180 to a biometric feature of the targeted subject 10. Additionally or alternatively, the beam steering systems may direct photons reflected from the biometric feature to the appropriate imaging system. The optical axis of the dual eye illuminator moves up and down with respect to the optical axis of the iris lenses with increasing and decreasing Z-distance.

Embodiments of the present invention meet the safety criteria of Class I ANSI Z136. In general, the maximum permissible exposure (MPE) for continuous wave exposure at 850 nm is approximately 2 $mW/cm^2$. As such, the illumination source 180 in some embodiments may provide illumination with a wavelength of 850 nm for up to 30,000 seconds. On the other hand, the maximum permissible exposure (MPE) for repetitive pulse exposure at 850 nm is approximately 0.56 $mW/cm^2$. Thus, the illumination source 180 in other embodiments may provide illumination with a wavelength of 850 nm in a 10 second pulse train with 50 nsec pulses at 10 KHz. Other considerations for laser safety include the operational environment, the use of additional optical devices, such as glasses and binoculars, by targeted subjects, as well as the presence of specular surfaces.

As illustrated in FIG. 1, the imaging systems 120, 140, and 160 each provide different fields of view. In particular, FIG. 1 shows that the scene imaging system 120 has the larger field of view 102, i.e., a scene field of view, which corresponds with a capture volume as illustrated in FIG. 5. The scene field of view 102, for example, may be several square meters, depending on the distance of targeted subjects from the scene imaging system 120. Any number of subjects for biometric identification may pass through and/or be positioned within the scene field of view 102. As illustrated, the heads 6 of subjects 5 are positioned within the scene field of view 102, while the heads 3 of subjects 2 are positioned outside the scene field of view 102. Additionally, FIG. 1 shows a smaller field of view 104, i.e., a face field of view, that corresponds with the face imaging system 140. For example, the area of the face field of view 104 may be approximately 0.15 $m^2$ The head 12 of a single targeted subject 10 is isolated within the scene field of view 102 for further biometric analysis. Moreover, FIG. 1 shows yet a smaller field of view 106, i.e., an eye field of view, that corresponds with the iris imaging system 160. The eye field of view 106 defines an area that isolates the irises 14 of the targeted subject 10 for biometric identification.

To obtain a full 360-degree field of view for the scene imaging system 120, the scene imaging system 120 may employ a plurality of scene cameras. The cameras may be arranged so that the scene field of view 102 for each camera overlaps, abuts, or nearly abuts other fields of view 102, whereby a series of fields of view 102 forms a continuous or nearly continuous a larger 360-degree field of view.

Alternatively, some embodiments may employ imaging systems which are all co-aligned using beam steering minors. As is known with other security monitoring systems, the use of a beam steering mirrors may be employed to enable the imaging systems to rotate through 360 degrees for observation.

Accordingly, some embodiments may identify multiple people within a 360 degree panoramic view. Employing such a system may require capturing images in rapid succession from a plurality of subjects who are moving within the panoramic view. Known techniques exist for stitching several detectors together to allow for rapid reading of the image to allow for increased frame rates. Moreover, aspects of these embodiments minimize occlusion of the subject's face and/or irises, minimize the time required to process the captured images, and overcome the constraints associated with the mechanical operation of the system.

Referring to FIG. 1, the system 100 may generally employ at least one controller 190 to control the operation of the imaging systems 120, 140, and 160, as well as other aspects of the present invention. The controller 190 may also be employed to process the image data captured by the imaging systems 120, 140, and 160. Furthermore, the controller 190 may control the operation of the beam steering system 195, the rangefinder 189, and the illumination source 180 as a part of a target acquisition system. As is known, the controller 190 may include one or more programmable processing devices that execute software, or instructions stored on machine-readable media. For example, the controller 190 may employ an external conventional computer networked with the image systems 120, 140, and 160, as shown in FIG. 1. Alternatively, a field programmable gate array (FPGA) or digital signal processor (DSP) may be employed on board a single image capture device that houses the imaging systems 120 140, and 160. Combinations of single and/or multiple programmable devices, including computers, FPGAs, and DSPs may be employed with various communications topologies and physical configurations to achieve scalable speed and/or performance targets.

Thus, with the face imaging system 140 and the iris imaging system 160, the multimodal biometric system 100 generates images of the face and two irises for biometric identification. The controller 190 may operate the face imaging system 140 to capture an image of the subject's face 12 and the iris imaging system 160 to capture images of each iris 14 from the subject's right and left eyes all simultaneously, or near simultaneously.

Figure 7A:
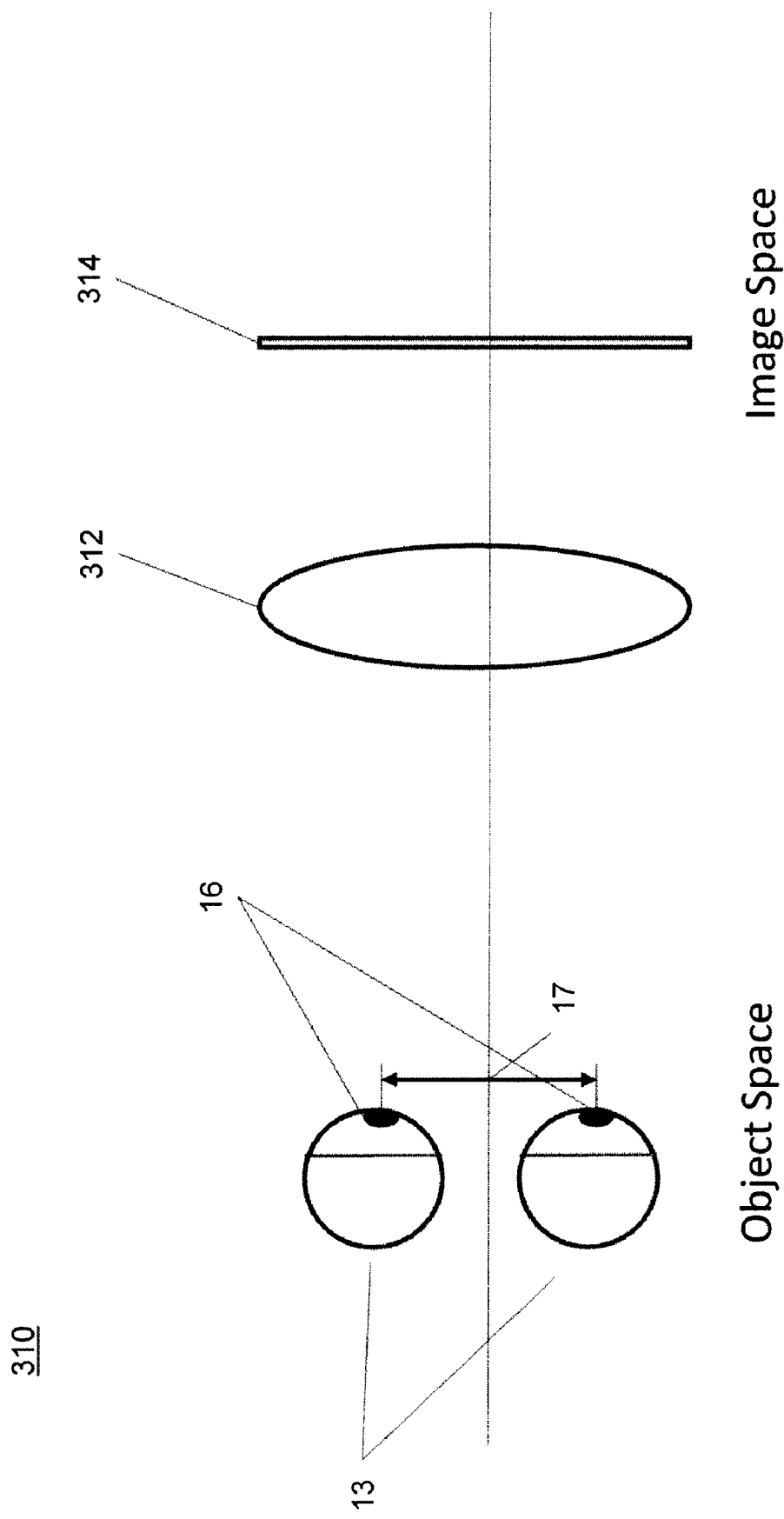
FIG. 7A illustrates an embodiment of a two-eye simultaneous iris acquisition system according to aspects of the present invention.

As described previously, embodiments may employ various configurations of imaging systems that capture two iris images. For example, FIG. 7A illustrates a two-eye simultaneous iris system 310, which employs a two eye iris imaging system that respectively captures iris images of the right and left eyes 13, all simultaneously, or near simultaneously. Information from the individual imaging systems are used in combination to establish a host of attributes including, but not limited to, positioning, focus, and interpupillary distance. The interpupillary distance 17 is illustrated in FIG. 7A.

In the embodiment of FIG. 7A, the system 310 for multimodal biometric identification has an imaging lens 312 and an imaging system 314 with two sensors where the two sensors reside on the same printed circuit board. The sensors are spaced appropriately to allow for interpupillary distances 17 from the 1% interpupillary distance of a female to the 99% interpupillary distance of a male. This spacing is dependent on the size of the sensor, the pixel size, the pixel resolution required, and the magnification of the system. For instance, a system may include two 752×480 pixel sensors, with a pixel size of 6.0 µm separated. The system may have an average pixel resolution across an iris of 21.1 lp/mm.

Figure 7B:
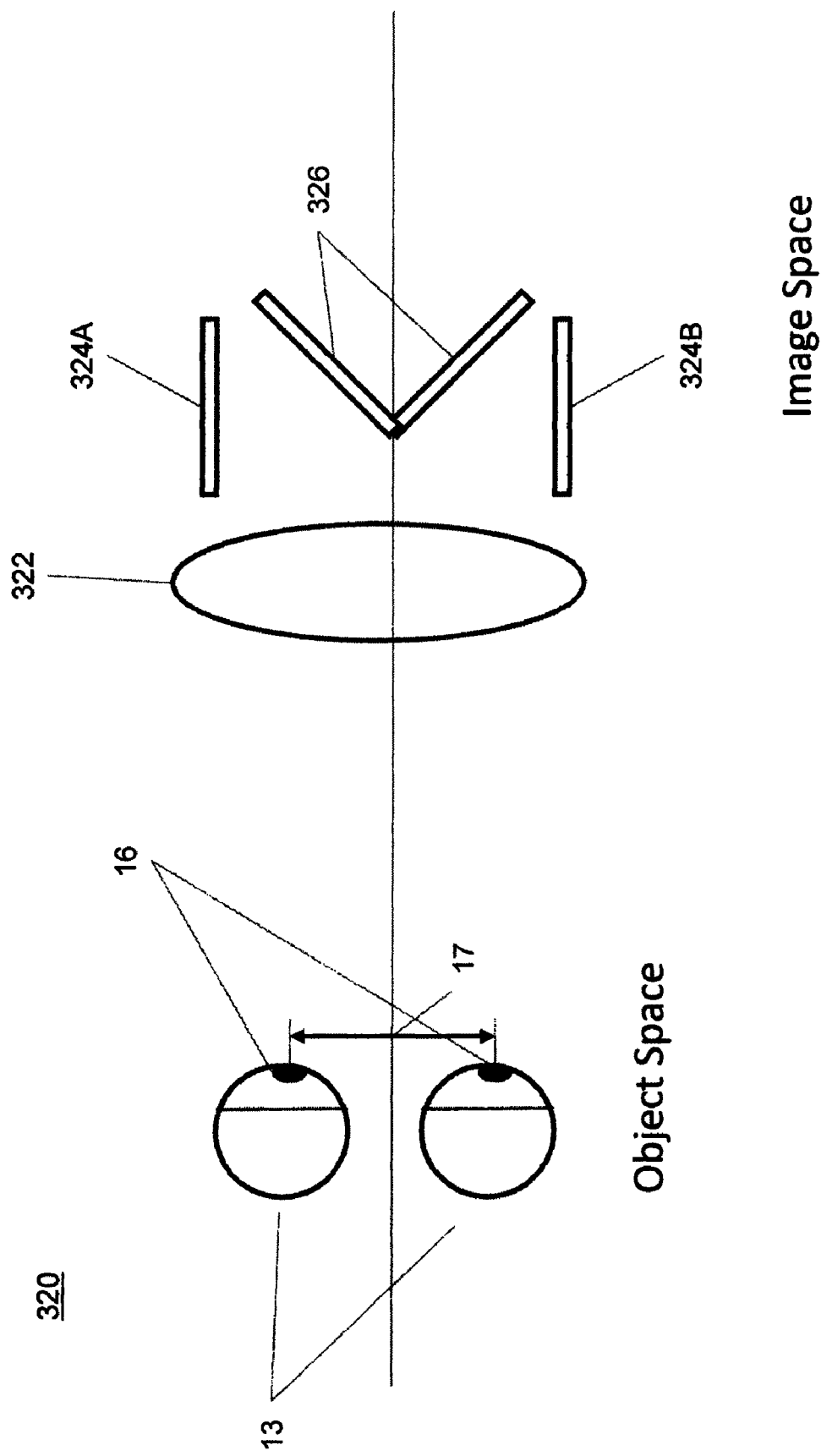
FIG. 7B illustrates another embodiment of a two-eye simultaneous iris acquisition system according to aspects of the present invention.
Figure 7C:
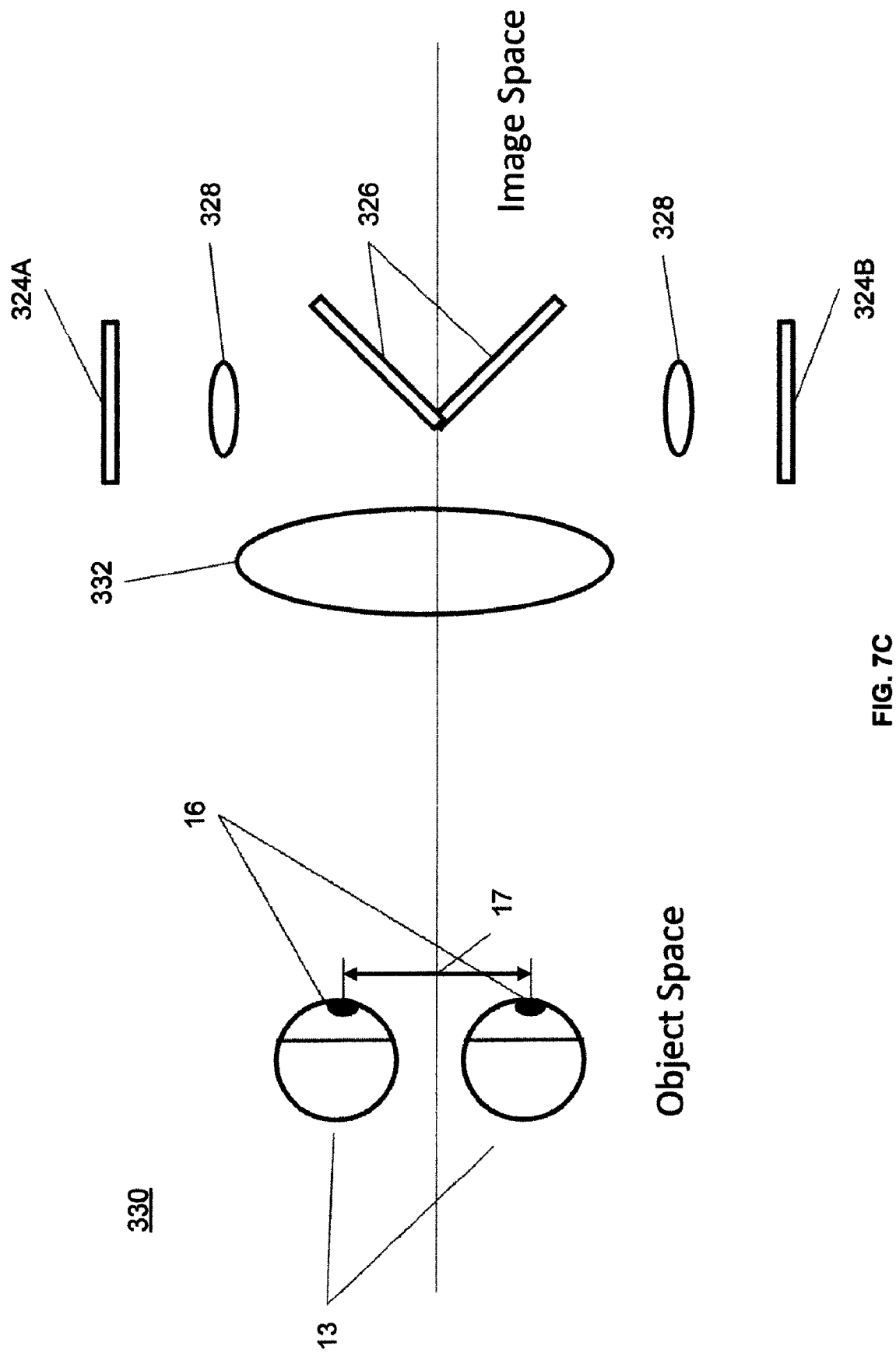
FIG. 7C illustrates yet another embodiment of a two-eye simultaneous iris acquisition system according to aspects of the present invention.

As illustrated in FIG. 7B, an alternative multimodal biometric system 320 includes two beam splitters 326 at the image plane of the imaging lens 322 splitting the images of each eye and sending them to individual sensors 324A and 324B. As illustrated in FIG. 7C, in another multimodal biometric system 330, the imaging lens 332 and the beam splitters 336 are combined with relay lenses 338 to direct images of each eye and sending them to individual sensors 334A and 334B. The relay lenses 338 may be employed to increase or decrease magnification. This may be especially important for long distance imaging where the primary lens is significantly large to ensure proper resolution of the iris images and the cost and physical size constraints make it necessary.

Embodiments may also employ auto focus for the camera systems. One configuration for auto focus employs a motorized lens that moves the focus of the imaging lens in specific focus value increments. The system utilizes a focus measure process comparing successive positions. If the system remains out of focus, the system uses this comparison to determine in which direction it should move.

A challenge in acquiring images for biometrics of irises and faces is to determine the level of focus during the acquisition process to create a biometric template. Iris and face images may present more challenges than inanimate objects. In particular, the size of irises, ranging from approximately 9.5 mm to approximately 13.5 mm requires a narrow focus range, as the field of view, e.g., the field of view 106 in FIG. 1, is small. In addition, movement due to head and body motion requires real-time analysis of focus measurement. Furthermore, eye safety illumination limits must be met by finding the correct trade-off between lens size and the F# of the lens to obtain sufficient exposure of the image. By stopping down the lens, the depth of focus goes up at the expense of illumination efficiency. Additionally, the targeted eyes and face usually start from an unfocused position at an unpredictable distance away.

Figure 8:
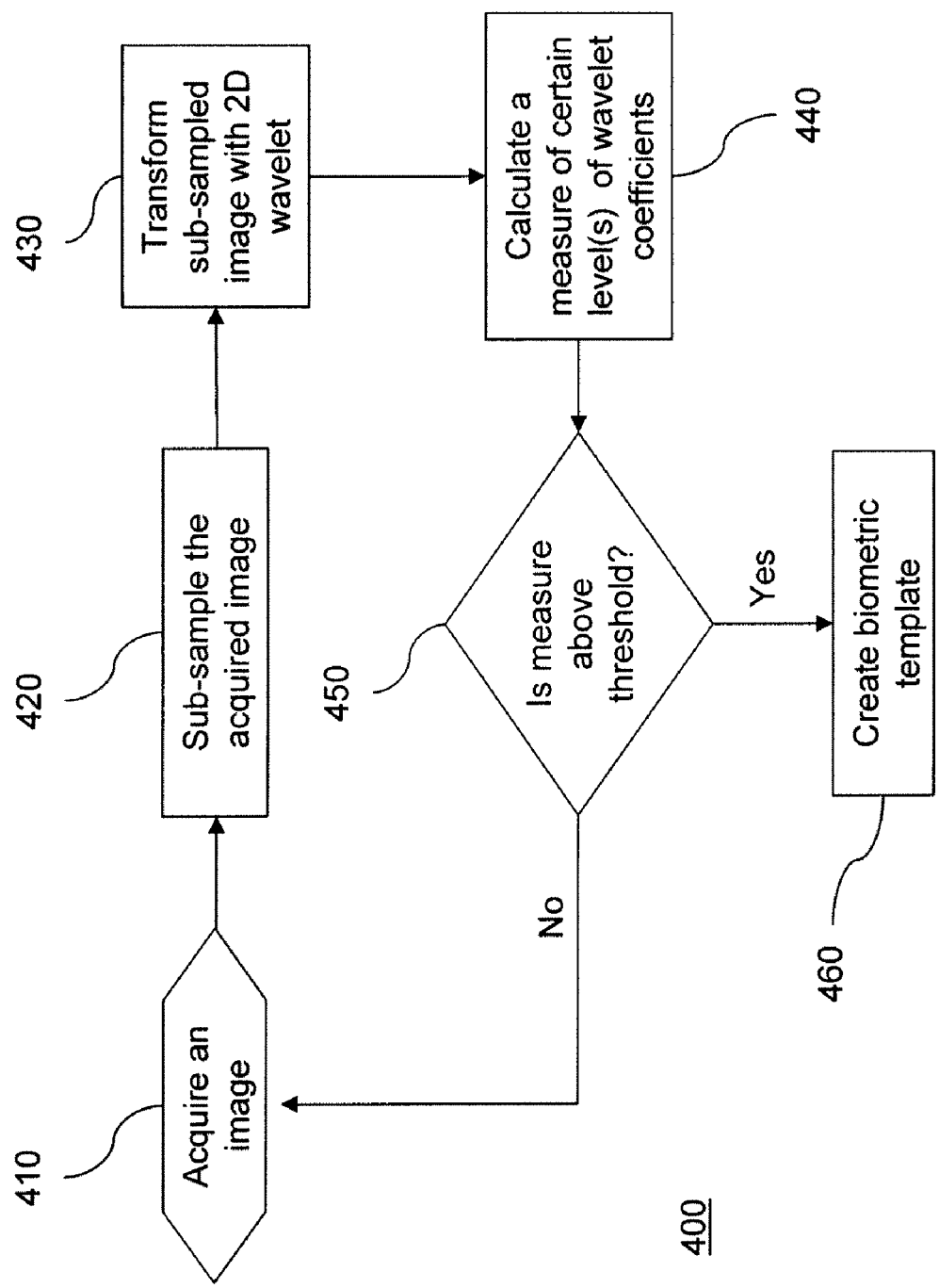
FIG. 8 illustrates a process for determining a focus measure for captured images according to aspects of the present invention.

Using a processing system, such as the controller 190 in FIG. 1, embodiments according to aspects of the present invention may employ a process 400 shown in FIG. 8 to determine a focus measure for the captured images. Initially, as FIG. 8 illustrates, an image is acquired in act 410. In some embodiments, the acts are applied to a specific region of interest. The acquired image may be sub-sampled in act 420 to reduce the size to half the original size. In act 430, the sub-sampled image is transformed once with a 2D wavelet, e.g., the Daubechie wavelet. In some embodiments, the wavelet transform coefficient of level 1 of a half-sized image is employed. The focus measure for the image is calculated in act 440 according to certain measures of wavelet coefficients of a certain level or mixed levels. For example, the standard deviation of the wavelet coefficient of the entire image may be used as the focus measure. The calculated focus measure is compared to a threshold in act 450 to determine whether the acquired image can be employed to further derive biometric data in step 460. If not, another image may be acquired in act 410.

A scheduler processing module may be employed, for example by the controller 190, to control the sequence of calls to a PTU control processing unit. Movement of the PTU 195 generally involves (1) movement associated with the scene field of view 102, where the PTU 195 is moved relative to face coordinates in the scene field of view 102 such that the face imaging system 140 is centered on the subject's face; or (2) movement associated with the face field of view 104, where the PTU 195 is moved relative to face and/or eye coordinates in the face field of view 104 such that the irises are centered for the iris imaging system 160. Further aspects of the scheduler processing module are described in detail further below.

For movement associated with the scene field of view 102, the face coordinates (x, y) in the scene field of view 102 are mapped to PTU pan and tilt coordinates via offline calibrations. These pan and tilt coordinates are absolute values and calls are made to the PTU 195 to move to these coordinates.

For movement associated with the face field of view 104, an object pixel, $(x_o, y_o)$, in the face imaging system 140 is inferred from the detection of a subject's face and/or eyes in the face field of view 104. A target pixel, $(x_t, y_t)$, i.e., the pixel that this object must be in for the centering of the subject's irises in the iris cameras, is calculated. The position of this pixel is calculated via iris-face camera calibration. The distance $(d_x, d_y)$ from the object pixel, $(x_o, y_o)$, to the target pixel, $(x_t, y_t)$ is converted into incremental pan and tilt steps, $(d_p, d_t)$.

One approach uses an estimation of the subject's range (via a rangefinder reading or inferred from the object's size) and a calibration of the face camera's magnification with range to convert the pixel distance $(d_x, d_y)$ into the required changes in PTU angle. An alternative approach uses a history of requested movements and resultant face image displacements to iteratively move the object pixel to the target location such that the distance $(d_x, d_y)$ is minimized.

Once the required incremental pan and tilt steps, $(d_p, d_t)$ are known the PTU is either moved incrementally through these angles or a PTU model infers where the PTU is, (p, t), and the incremental move is converted to an absolve move, $(p+d_p, t+d_t)$. As described below the PTU model holds a memory of the state of the PTU synchronized with face image frame number. The PTU control unit effectively asks the PTU model for the state of the PTU corresponding for to the time at which the relevant face image was recorded. Calls are then made to the PTU to either request an incremental move of $(d_p, d_t)$ or an absolute move to $(p+d_p, t+d_t)$.

Synchronized with the acquisition of an image from the face imaging system 140, a PTU model reads the position, velocity and acceleration associated with the state of the PTU 195. This information is stored in the PTU model unit along with a memory of recent readings. Each PTU state is tagged with its associated image frame number. The time elapsed between each PTU state calculated via a global clock or inferred from its associated face image frame number. When the PTU control unit asks the PTU model for its state it asks for a state associated with a particular face image frame number. The PTU model returns the PTU state corresponding to this frame number.

In one embodiment the requested peak velocity, $v_p$, and acceleration magnitude, a, of the PTU are set to constant values and calls made to the PTU are positional without specifying specific peak velocities and acceleration magnitudes. When a "move to" request is made to the PTU the unit accelerates at acceleration ±a until either it reaches the requested position or it reaches the peak velocity, $v_p$.

An alternative embodiment uses two different peak velocities, $v_s$ and $v_f$, and two different acceleration magnitudes, $a_s$ and $a_f$, for inferred moves by the scene imaging system 120 and inferred moves by the face imaging system 140.

In sum, embodiments as shown in FIG. 1 provide a multi-biometric system developed as an inter-disciplinary research and development effort at the cross-roads of traditional biometrics and video surveillance. The embodiments integrate video surveillance techniques with an opto-mechanical system design. Multiple cameras with their respective fields of view are shown. The fixed scene camera is used for wide area scene surveillance to detect and track humans. A scheduler ranks faces in the scene field of view and directs the PTU in sequence to all active subjects. A list of previous acquisition events prevents repeat acquisitions of the same subject. The face imaging system, which has a narrower field of view is used to acquire a higher resolution image of the subject's face. This imaging system is mounted on the PTU assembly along with a rangefinder, iris laser illuminator and a dual-iris camera. Images generated from the face imaging system are also used to locate and track the subject's eyes. A target point is located on the subject's face mid-way between their two eyes. The problem of long-distance iris illumination is solved using an innovative design of a laser illuminator. The designed laser illumination propagates a collimated beam that maintains its uniform illumination profile up to large distances. Iris image resolution requirements are addressed using a scalable optical design. A long focal length zoom lens is used in conjunction with a custom designed dual sensor iris camera. The dual sensor iris camera may be made up of two image sensors of at least VGA-level resolution. The motion of the subject is accounted for by a subject-servo-loop that tracks both the motion of the PTU assembly and the subject. Eye tracking in the face imaging system is combined with range information using an optical rangefinder. The zoom and focus of the iris lens are controlled to match the subject's range trajectory. The issue of the acquisition of non-iris images is addressed by a three-level hierarchical processing. The first level processes information at the human level, so non-human regions can be filtered from further processing. The second level process information at the level of a subject's face. This processing makes sure that non-eye regions are not processed for iris localization. The third level of iris localization is then activated only when the system has been positioned to acquire a subject's irises.

Biometrics based on a combination of facial and iris data, as provided by the system of FIG. 1, are more accurate and robust than using biometrics that include data from only a single iris or only the face. Furthermore, such embodiments exhibit lower fail-to-acquire (FTA) metrics than iris or face only systems and are less susceptible to spoofing. Advantageously, the iris and face present biometric features that are both independent and coupled. They are independent in that they are extracted from different biological structures. On the other hand, the iris and face biometric features are strongly coupled because there is a fixed geometric relationship between the iris and the face. Specifically, the position and orientation of an eye is reflected simultaneously in both the iris and the face. The coupling between the biometric features of the iris and the face not only facilitates the simultaneous capture of these biometric features, but allows these features to be cross-referenced or combined in a common feature space that preserves the geometric relationship between the iris and face. In addition, the use of an iris system complements the use of face system.

Furthermore, capturing images of both irises simultaneously, or near simultaneously, presents biometric features that are also both independent and coupled. They are independent in that they are extracted from different biological structures. On the other hand, two irises are strongly coupled because there is a fixed geometric relationship between them on the face. In this way, the speed at which a database can be search can be greatly increased through the use of interpupillary distance. In general, embodiments of the present invention may employ various configurations of imaging systems that capture iris images and face images.

Figure 2:
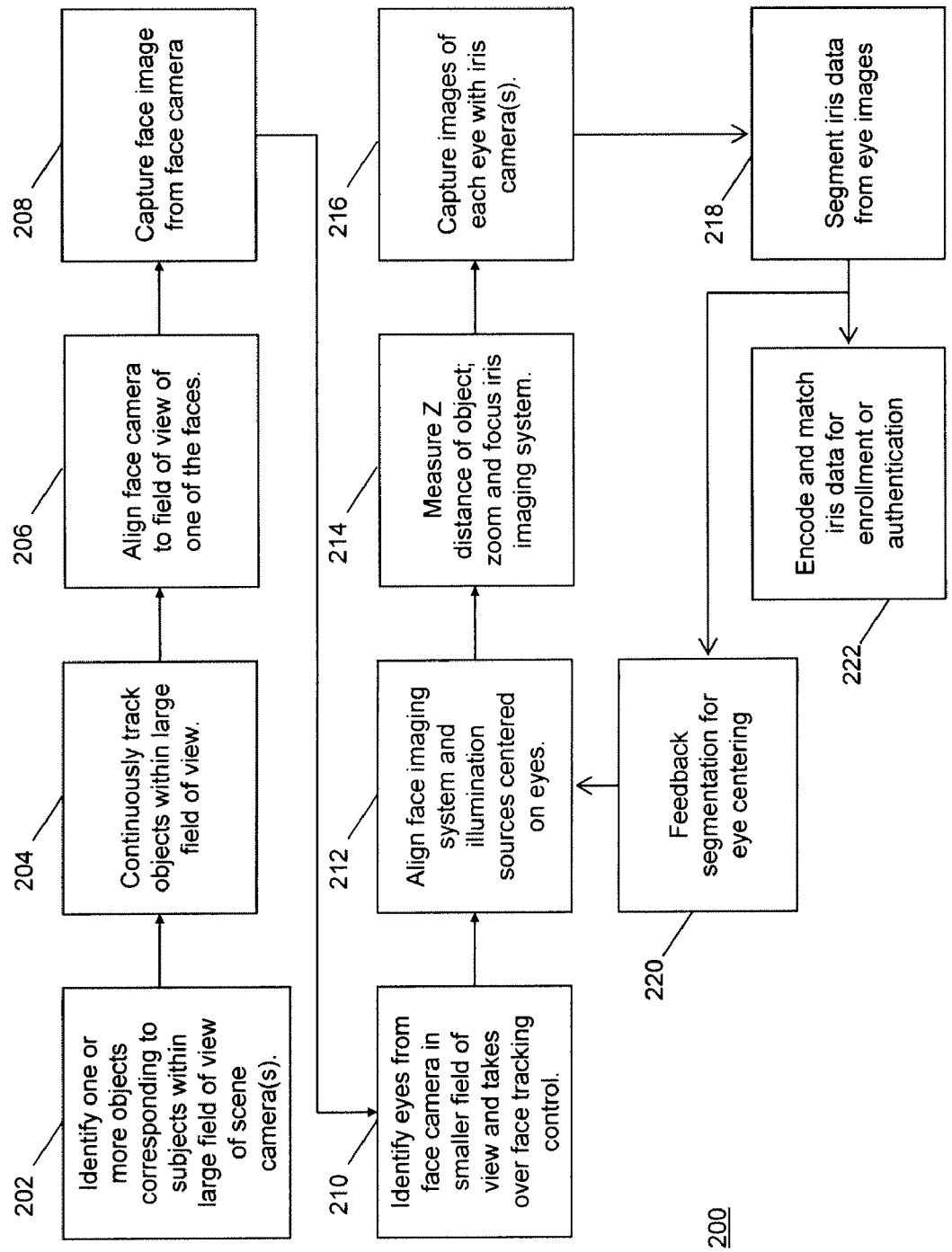
FIG. 2 illustrates an approach for capturing and processing biometric data from a subject's face and two irises according to aspects of the present invention.

Referring to FIG. 2, an exemplary process 200 for operating the multimodal biometric system 100 is illustrated. With the scene imaging system 120, the system 100, in step 202, identifies one or more objects, corresponding to the heads 6 of subjects 5 in the scene field of view 102. In step 204, the system 100 continuously tracks all objects, which may move within the scene field of view 102. In step 206, the system 100 aligns the center of the face field of view 104 to one of the objects. As shown in FIG. 1, the object in the face field of view 104 corresponds to the head 6 of the targeted subject 10. In step 208, the face imaging system 140, which is co-aligned with the scene imaging system 120, captures an image from the face field of view 104 at a sufficiently high magnification and resolution to permit face identification. In step 210, the system 100 identifies the eyes of the face 12 and takes over control of tracking. In step 212, the system 100 adjusts the targeting system to align the face imaging system 140 as well as the NIR illumination source 180 with an area substantially centered on the eyes. In step 214, the rangefinder 189 measures the Z distance of the object and zooms and focuses the iris imaging system 160. In step 216, the iris imaging system 160 captures images of the irises 14. In step 218, the iris data is segmented from the images. In step 220, feedback from the iris segmentation may be used to fine tune eye centering if required. In step 222, the segmented iris data is encoded and matched for enrollment or authentication. Authentication may include identifying a subject or verifying a subject's identity. As discussed previously, the iris imaging system 160 may have one or more iris sensors with higher magnification for capturing images of the irises 14. As such, the center of the iris sensors are aligned with the eyes and the iris sensors capture the images of the irises 14. As provided by step 204, throughout the process 200, the system 100 continues to track the objects it has identified in the scene field of view 102, including the objects which have already been targeted for biometric identification and processed according to steps 206 through 222. In this way, the system 100 is able to determine which objects still need to be targeted for biometric processing.

Information captured by the face imaging system 140 and the iris imaging system 160 is used to establish facial pattern recognition, iris pattern recognition, as well as biometric fusion. To achieve biometric identification, the information from the imaging systems may be used to determine a host of attributes including, but not limited to, positioning of the face or the irises, tracking of the face or irises, measurements of focus provided in the images, and interpupillary distance.

For example, the software executed by the controller 190 for capturing and processing images of the face 12 and irises 14 may determine characteristics such as linear (X,Y,Z) position of the head, head pose angle, and eye-gaze angle. Head pose angle indicates pitch, yaw, and roll, where pitch refers to up-and-down rotation of the head, yaw refers to side-to-side rotation of the head, and roll refers to rotation the head along a direction from ear to shoulder. Meanwhile, eye-gaze angle refers to the up-and-down or side-to-side viewing angle of the eyes.

To minimize the effect of environmental factors, such as heat from hot surfaces which can distort captured images, some embodiments may employ a Hartmann-Shack sensor and optical wavefront illumination to correct for these environmental factors.

While the embodiments described previously may employ NIR laser illumination for the facial/iris imaging system, other embodiments of the present invention may employ LEDs or flash lamps rather than laser diodes. As such, in these alternative embodiments, the system can perform facial and iris liveness testing. Facial liveness testing detects whether the biometric information comes from a living source. (U.S. patent application Ser. No. 11/258,749, filed on Oct. 26, 2005, describes a METHOD AND SYSTEM FOR DETECTING BIOMETRIC LIVENESS, and is entirely incorporated herein by reference.)

Moreover, while the embodiments described previously may direct NIR laser illumination over a long distance to the face or the irises, other embodiments may employ use of LED's positioned more closely to the targeted subject. For example, such LED's may be employed to illuminate a subject as the subject is guided down a specific corridor of known length and width. In other words, if the subject is guided near a known position, an illumination source may be set up near the known position so that photons for image capture do not have to be transmitted over longer distances.

Additional on-axis illumination of the iris can also enable bright pupil back reflection ("red eye") that can enhance the iris processing.

Embodiments of the present invention may be fully automatic or may require some operator input, especially with regard to initial targeting of subjects. In other words, an operator selectively targets subjects for biometric analysis. Advantageously, the operator can ensure that the illumination sources are not directed at subjects who may susceptible to eye damage from photons emitted by the illumination sources. For example, embodiments of the present invention may be employed to identify and screen subjects at an event, such as a highly attended sporting event. At such events, spectators often use optical aids, such as binoculars, to view the game or match. Eye damage might result if laser illumination is conducted to the eyes of a targeted individual through such an optical aid. As a result, an operator-assisted mode can prevent the laser illumination from being directed at subjects using an optical aid.

Once the positioning of the biometric features is determined and images are captured by the facial/iris imaging system, the software executed by the controller 190 also detects and processes images of the face 12 and irises 14 in the captured data. For instance, as shown in step 218 of FIG. 2, the images of the irises are segmented from the captured data, and before the segmented iris images are passed on for further biometric processing or matching, the segmented iris images may be tested according to a variety of criteria measuring the quality of an image.

Once the iris image data is segmented and tested according to step 218, the iris image data may be employed for biometric matching with databases of existing iris data or may be recorded for biometric enrollment, as shown in step 222. When iris data is collected from multiple subjects in rapid succession, the enrollment may be anonymous, i.e. recorded without further identification data, such as a name.

Figure 11:
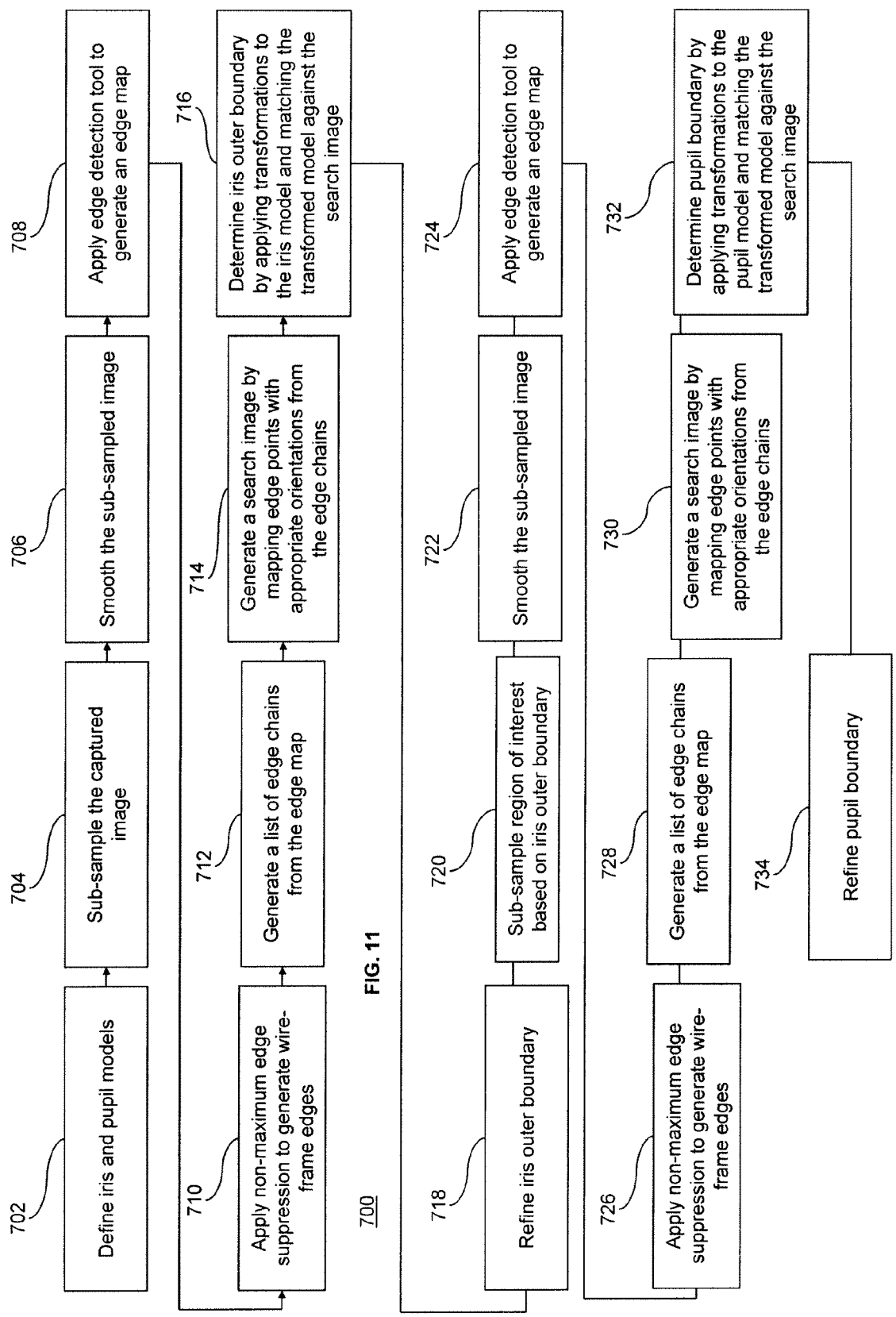
FIG. 11 illustrates a process for segmenting the images of the irises from the captured data according to aspects of the present invention.

One approach for segmenting the images of the irises from the captured data in step 218 of FIG. 2 is illustrated in FIG. 11. All existing iris segmentation techniques typically assume, or even require, that a pupil has the lowest intensity in the eye region. Such techniques therefore exclude from biometric analysis an entire class of images that might be acquired with on-axes illumination and possess non-traditional patterns of polarity. However, certain situations may only be able to provide images with on-axes illumination. Thus, an inability to process such images may result in a significant limitation.

Accordingly, embodiments according to aspects of the present invention employ a technique that efficiently segments the iris region in images regardless of the polarity of a pupil relative to the iris. Furthermore, these embodiments are also invariant to uneven illumination of opposing (right and left) sides of iris/sclera interfaces.

The segmentation technique is based on pattern matching. Both an iris and a pupil are represented by models. Model selection is driven by image features that must be polarity independent. Boundaries (edges) between regions of image with different intensity levels (such as pupil and iris or iris and sclera) are known to be polarity independent. Accordingly, wire-frame type models may be employed. The models are matched to edges extracted from runtime images. The results are then refined by using variations of the models.

There are several challenges in applying pattern matching approach to iris segmentation. Although the wealth of texture and other features human iris produce an excellent source for biometric data, the same texture and features result in the detection of many edge points by common edge detection tools. Such edge points may easily confuse the pattern matching process. For example, additional edge points may result from the presence of eye lashes in the image. As such, the embodiments employ additional measures to reduce the edge clutter. Moreover, variations of shapes of iris and, especially, pupil boundaries present other challenges. For example, assuming that the pupil is always circular in shape may result in inaccurate segmentation.

The process 700 shown in FIG. 11 addresses at least the two foregoing challenges. Initially, the iris and pupil models are defined in act 702. In particular, the pupil and the iris are represented by a corresponding base model and a set of "distorted" models. For example, the base model of an iris may be a set of two circular opposing arcs, i.e., opposing arc segments defined by the right and left sides of an imaginary circle. The missing sections of the imaginary circle, i.e., opposing arc segments defined by the top and bottom sides of an imaginary circle, reflect the possible presence of occlusion by the eyelids. On the other hand, the base model of a pupil may be a complete circle. The "distorted" models represent possible deviations of iris and pupil boundaries from their (circular) base model shapes that may be caused by imaging conditions, e.g., gaze or off-axes camera position, plus some natural variations.

The process 700 first determines the iris outer boundary and then the pupil boundary, also referred to as the iris inner boundary. The outer iris boundary has lesser degree of variability among individuals (about 30%), while pupil size can vary by as much as 400% depending on physiology of an individual and illumination conditions in the imaging process. In addition, contrast of the sclera/iris interface may be generally better than that of the pupil/iris interface.

To search for the iris outer boundary, the captured image is sub-sampled in act 704. The sub-sampling factor maybe four or higher. The sub-sampling by averaging may be employed, as it contributes to washing-off minor edges. In act 706, the sub-sampled image may be further smoothed by Gaussian filtering to minimize clutter edges.

In act 708, an edge map, or edge image, is generated by applying an edge detection tool, such as Canny or Shen-Castan edge detection tool or the like. Some edge detection tools, such as Canny, apply Gaussian smoothing internally. In such cases, the external Gaussian smoothing in act 706 is adjusted accordingly. In addition, in act 710, non-maximum edge suppression is applied to generate wire-frame edges, if not done internally by the edge detection tool of act 708.

Act 712 of process 700 then generates a list of edge chains from the edge map. Each edge node in the chains includes edge orientation information in addition to edge location.

A search image is generated in act 714 by mapping edge points with appropriate orientations from the edge chains. As such, edge points with, for example horizontal orientations do not interfere with the search for edge points with the vertical orientation. One can think of the search image as a 2D point set. Note, that the wire-frame models used in the process are also 2D point sets.

The combination of sub-sampling, Gaussian smoothing, as well as exclusion of inappropriately oriented edge points, results in significant reduction of edge clutter.

The search process for the iris outer boundary is in effect a process of determining a transformation that brings one 2D point set in match with another 2D point set. Here, the transformations are limited to 2D translation and scaling. In particular, in act 716, transformations are applied to the iris model and the transformed model is matched against the search image. Various methods of 2D point set matching may be employed. One example employs a look-up table with a distance transformed search image. Another example employs a Hausdorff distance computation. The search process for the best transformation is optimized. One example of an optimization technique applies the Levenberg-Marquardt algorithm.

The search for iris outer boundary in the sub-sampled image produces an estimate of the outer iris boundary center and radius (as a circular object). Refining of the iris outer boundary in act 718 takes place in the very specific and "tight" region of interest (ROI) of the full resolution image as determined by the estimated data. This second round of search for the precise iris outer boundary is conducted by applying Gaussian smoothing to the region of interest, detecting edges, selecting appropriate edge points, and then searching for the best transformation in the much tighter space. Several "distorted" models are used at this phase to find the best shape of the iris inner boundary. Using the "distorted" models at the final phase of the process (in the very limited search space) results in more accurate boundary description.

A new ROI is determined from the iris outer boundary found previously. The new ROI may be about 30% smaller than the rectangular inscribing the iris outer boundary. The ROI is sub-sampled in act 720 by a factor of 2 and further smoothed by Gaussian filter in act 722. The smoothing may be less than in the case corresponding to the iris outer boundary to preserve possibly weaker pupil/iris boundary. The search for pupil boundary in acts 724-732 then proceeds with the pupil base model. When the best estimate is found, the refining process in act 734 takes place in the full resolution image in the manner similar to that described in act 718.

Features of the iris software may alternatively or additionally include segmentation methods and iris quality measures discussed in U.S. application Ser. No. 11/898,190, filed on Sep. 10, 2007, which claims priority to U.S. Provisional Application No. 60/844,659 filed Sep. 15, 2006, the contents of all these applications being incorporated entirely herein by reference. Also related is U.S. application Ser. No. 11/798,500 filed May 14, 2007, which claims priority to U.S. Provisional Application No. 60/800,023 filed May 15, 2006, U.S. Provisional Application No. 60/812,949 filed Jun. 13, 2006, and U.S. Provisional Application No. 60/819,630 filed Jul. 11, 2006, the contents of these applications also being incorporated entirely herein by reference.

Figure 12:
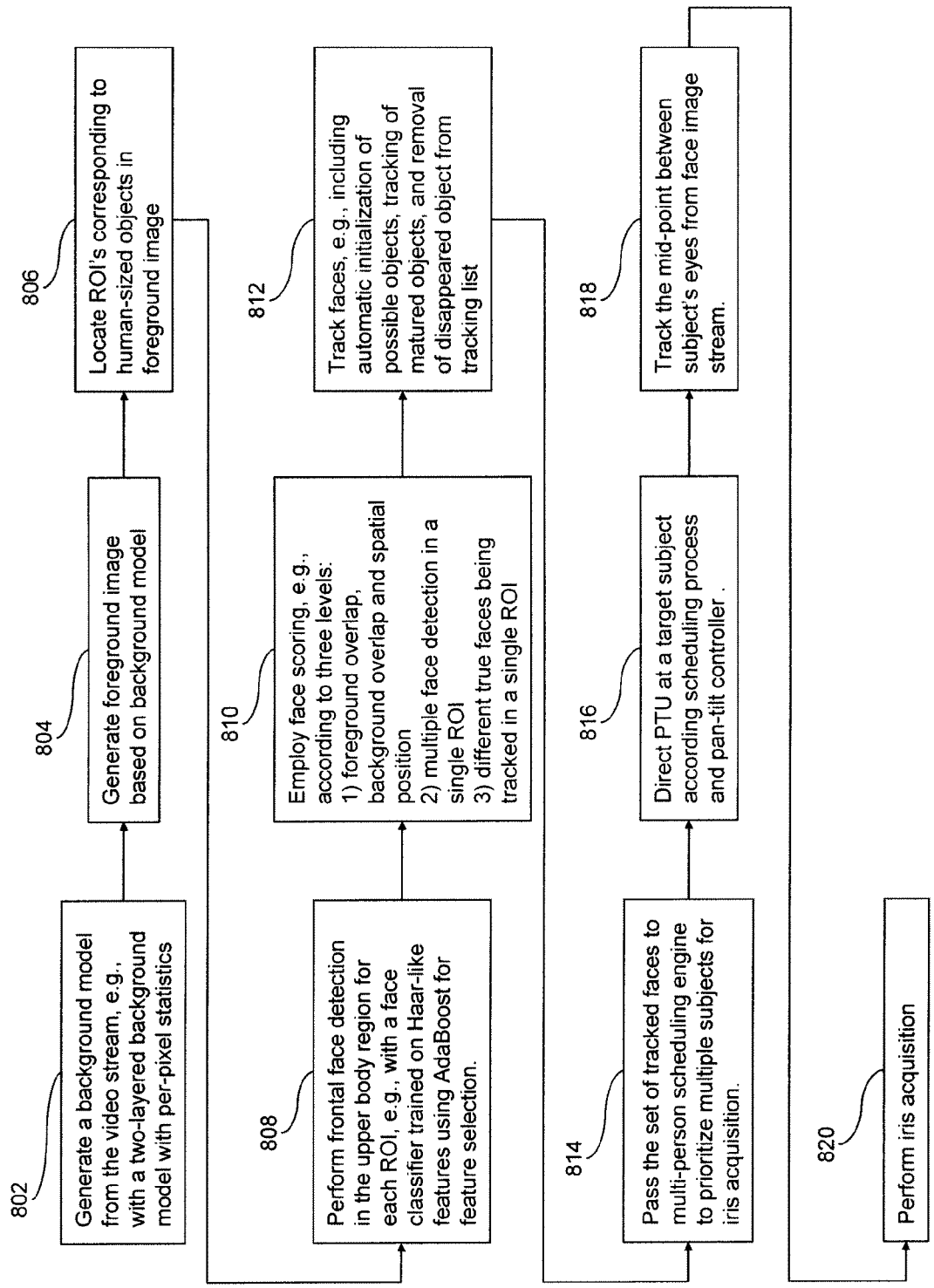
FIG. 12 illustrates an approach for processing acquired images from the scene imaging system according to aspects of the present invention.

FIG. 12 illustrates an approach for processing acquired images, i.e., a video stream, generated by the scene imaging system 120. As described previously, the scene imaging system 120 may be used to monitor the scene field of view 102 under surveillance for newly entering human subjects 5. In an example application, the subjects 5 with facing toward the scene imaging system 120 may be tracked and prioritized for biometric analysis.

As shown in FIG. 12, a background model from the video stream is first generated in act 802 to detect the pixels that exhibit significant intensity changes. This is accomplished by generating and maintaining a per-pixel statistical model of the scene background as estimated from the incoming video frames. In particular, embodiments implement a two-layered background model with simple per-pixel statistics: a "slow-learning" background layer $l_s^n$ and a "fast-learning" background layer $l_f^n$, where n is the time index or frame number. For each layer, the embodiments maintain a per-pixel learning rate which is initialized to a high learning rate during the training phase of up to first $N_t$ frames and is switched to a lower learning rate at the end of training phase:

$$\overline{\omega}_i^n = \begin{cases} \omega_i^{Pt} \mid 0 \le n < N_t \\ \omega_i^{Pd} \mid n = N_t \end{cases} \quad (1)$$

where $i \in l_s, l_f, \omega_i^{Pt}$ represents training phase learning constant on $i^{th}$ layer and $\omega_i^{Pd}$ represents detection phase learning constant on $i^{th}$ layer for initialization at each pixel. The update for learning weights images are explained later in this section. Given the incoming image stream, the per-pixel learning weights image and learned background layers, the background images at each layer are updated as:

$$B_i^n = \begin{cases} I^n & n = 0 \\ I^n \cdot \omega_i^{Pt} + B_i^{n-1} \cdot (1 - \omega_i^{Pt}) & 0 < n \le N_t \\ I^n \cdot \overline{\omega}_i^{n-1} + B_i^{n-1} \cdot (1 - \overline{\omega}_i^{n-1}) & n > N_t \end{cases} \quad (2)$$

where $\overline{\omega}_i^{n-1}$ denotes learning weights image for layer $i \in l_s, l_f$ at previous frame, and represents background $B_i^n$ represents background image at $n^{th}$ frame. The background model update in the detection phase is performed every $N_i^{th}$ frame. Binary thresholding is applied on the difference image between current and background images to generate mask image for each layer:

$$M_i^n = \begin{cases} 0, \mid B_i^n - I^n \mid \le \delta \\ 1, \mid B_i^n - I^n \mid > \delta \end{cases} \quad (3)$$

where $\delta$ represents the tolerance level of pixel deviations. The mask image from the first layer is used in conjunction with Eq. (2) to update the background image for second layer; i.e., only the pixels included in binary mask of first layer as background pixels are used to update the background image for the second layer. The final foreground image $G^n$ is generated in act 804 by a logical AND operator between the foreground image results of the two layers.

Thus, in one embodiment, the statistical model of the scene in the field of view 102 is generated from a fixed number of initial images streaming from the scene imaging system 120. A set of first N images, e.g., 60 images, is used to build this model. The background generation module subsamples the input images streaming from a 752×480 image sensor to quarter size and performs background model generation and update using these 188×120 pixel images. The first image is taken as current background representation. The statistics from next streaming images are combined with existing background model at each time step in the multi-level framework described previously. The second level of background model is updated based on binary detection results from first level. The set of pixels marked as foreground in the first-level background model image are used as a mask to update the second-level background image. Also, in the second-level background model update, the dichotomy of different weights for background training and foreground detection stages is maintained. The resultant binary foreground image is generated after combining the foreground detection results from the two layers of background model. A foreground image for a given layer of background model is generated after comparing the background model with input image. The plurality of pixels in input image which differ more than a fixed global threshold from the corresponding pixels in background image are marked "1" for foreground pixels. All other pixels whose grey-scale values lie within threshold difference with background model are marked "0" for background pixels. For every frame, the foreground mask is thus generated.

The binary foreground image is then used in act 806 to locate the regions corresponding to human-sized objects in the capture volume. The foreground human regions are located from the horizontal and vertical projection histograms in the binary foreground image. Although the projections are orthogonal in this example, it is understood that non-orthogonal projections may be employed. The process for the localization of multiple human regions is provided by TABLE 1.

TABLE 1

Human_Detect
  Input: $G^n$
  Output: $R^H$
  Generate horizontal and vertical projection histograms $h_x$ and $h_y$
  Process $h_x$
    Locate all modes $m_x$, with span (start-end coordinates), maximum and average projection counts
    Reject modes with spans less than min. human width or maximum projection count less than min. human height. Store the span (width) and centroid for each valid mode as $m_x.w$ and $m_x.x$
    If all modes rejected, then return no human present.
  Process $h_y$
    Locate all modes $m_y$, with span (start-end coordinates), maximum and average projection counts
    Reject modes with spans less than min. human height or maximum projection count less than min. human width. Store the span (width) and centroid for each valid mode as $m_y.h$ and $m_y.y$
  Total human regions: $|R_H|=|m_x|.|m_y|$
  $R_H^i = (m_x^i.x, m_y^i.y, m_x^i.w, m_x^i.h)$ A post-processing step then performs any necessary width and height adjustments for human ROIs for the case of multiple humans at varying depths. This process generates a set of foreground human regions $R_H^1, \ldots, R_H^{nH}$. This set of foreground human regions $[R_H]^{nH}$ is used in conjunction with the set of detected faces and the set of tracked faces $[F_d]^{nd}$ to update the per-pixel background learning weights image for each of the two layers in background model. Each face in the two sets of faces is used to estimate corresponding human regions using square head model and body proportion constraints:

$\hat{R}^i.w = F^i.w \times 5$ $\hat{R}^i.h = F^i.h \times 15$ (4)

The merged set of human regions is formed as:

$\bar{R}_H = [R_H]^{nH} \cup [\hat{R}_d]^{nd} \cup [\hat{R}_t]^{nt}$ (5)

This set of human regions is then used to adapt the per-pixel learning weights for each layer of the background model:

$\bar{R}_H = \emptyset \lor \rho \notin \bar{R}_H,$ $\omega_i^{n+1}[\rho] = \omega_i^n[\rho] + \Delta | G^n[\rho] > 0 \hat{\omega}_i^n[\rho] < \omega_i^{pi}$ $\bar{R}_H \neq \emptyset \land \rho \in \bar{R}_H,$ $\omega_i^{n+1}[\rho] = \omega_i^n[\rho] - \Delta | G^n[\rho] < 1 \hat{\omega}_i^n[\rho] > \omega_i^{nd}$ (6)

where $\rho$ indicates pixel index, and $\Delta$ represents the increment update for learning rate. A large value of $\Delta$ will result in faster consumption of the background changes on current pixel.

As shown in act 808 of FIG. 12, frontal face detection is performed in the upper body region for each human ROI. Embodiments use the face classifier trained on Haar-like features using Ada-boost for feature selection. The frontal face detector generates a list of face regions detected in each upper human body region including some face false alarms. The false alarms are caused by various factors including background clutter, non-optimal illumination, etc. A face scoring mechanism is employed to probabilistically handle the case of false alarms. This postprocessing step filters out the face detection results which have lower probability of being true human faces based on human body constraints, results of foreground segmentation and the set of tracked faces. Face scoring in act 810 is implemented at three levels.

The first level computes face scores for each face detection result based on foreground overlap, background overlap and spatial position with human region, as:

$S_i = S_i^G + S_i^B + S_i^H$ (7)

where foreground overlap score component for $i^{th}$ face is:

$$S_i^G = \alpha^G \cdot \exp\left\{-\frac{\left(\frac{\sum G \cap F_i}{w_i^F \cdot h_i^F}\right)^2}{2(\sigma^G)^2}\right\}$$ (8)

Here $\alpha^G$ represents the weight factor for this component, G denotes the current binary foreground image, $R_i^F$ denotes the $i^{th}$ face region, and $w_i^F$ and $h_i^F$ represent the width and height of $i^{th}$ face, and $\sigma^G$ represents the standard deviation used for this score component. The background overlap score component is:

$$S_i^B = \alpha^B \cdot \left\{1 - \frac{\sum_{h_i^F} \sum_{w_i^H} G}{\sum_{h_i^F} \sum_{w_i^H} 1}\right\}$$ (9)

where $\alpha^B$ represents the weight factor for this component, and $w_i^H$ and $h_i^H$ denote the width and height of that human region which includes the $i^{th}$ face region. The score component for spatial position of face with respect to human region is:

$$S_i^H = \alpha^H \cdot \exp\left\{\frac{(y_i^F - y_i^H)^2}{2\left(\frac{w_i^H}{3}\right)^2}\right\}$$ (10)

where $\alpha^H$ represents the weight factor for this component, $y_i^F$ represents top-y coordinate of the $i^{th}$ face region, $y_i^H$ represents top-y coordinate of that human region which includes the $i^{th}$ face region and $w_i^H/3$ acts as adaptive standard deviation for this factor.

The second level of face scoring addresses the issue of multiple face detection results in a single human region of interest (ROI). This level of face scoring maintains the list of adjacent faces in a single human ROI. Out of all the faces in each human ROI, the face with maximum score from level 1 is multiplied by a large factor, while all other faces in that human ROI are scaled down by a small factor.

The third level of face scoring addresses the issue that different true human faces being tracked can end up in a single human ROI. This level establishes the correspondence between the set of tracked faces from previous frames up to this frame, and the set of detected faces in this frame. If multiple faces detected in a single human ROI correspond to tracked faces, their scores are increased by a multiplicative factor. The process for establishing correspondence between the list of tracked faces up to this frame, and the list of faces detected in this frame is similar to our face tracking process. A threshold in the range [0-1] on the face score is then applied to the set of scored detected faces. The set of faces scoring above threshold are kept as true detected faces. $F_d^1, \ldots, F_d^{n_d}$.

In act 812, the face tracking process implements an automatic initialization of possible objects, tracking of matured objects, and removal of disappeared object from tracking list. When a new true face is detected, it is added to list of possible faces. A face successfully tracked for $l^p$ frames is then added to the list of faces being tracked Similarly, a face that fails to be tracked for $l^d$ frames is purged from the tracking list and declared as disappeared. The implementation of the face tracking process is motivated by the unique constraint on the subject's head angle. Because the iris patterns of subjects in the scene field of view 102 are of interest, subjects who turn away from the system are not tracked. Also, it is difficult to capture both irises for subjects looking side-ways. This means that subjects consistently presenting profile faces become less of a priority for tracking. Finally, the iris recognition performance generally degrades beyond a ±20° side-gaze angle. Thus, embodiments employ a face tracking engine based on frontal face detection and probabilistic data association for multiple subjects face tracking. The face tracking based on data association works as follows: At each frame t, embodiments employ a set of detected faces from current frame $F_d^1, \ldots, F_d^{n_d}$: the second set is that of possible faces up to this frame $F_p^1, \ldots, F_p^{n_p}$; finally, the third set is that of tracked faces $F_t^1, \ldots, F_t^{n_t}$. Embodiments generate two similarity matrices; $M_p \in R^{n_p \times n_d}$ denotes the similarity between all possible faces and all detected faces, while $M_p \in R^{n_t \times n_d}$ denotes the similarity between all tracked faces and all detected faces. The similarity between two face regions is computed using a weighted sum of two factors, as:

$$m[F^i, F^j] = \alpha^m \cdot s^r[F^i, F^j] + (1-\alpha^m) \cdot s^o[F^i, F^j] \quad (11)$$

where $\alpha^m$ controls the weights for the two factors, $s^r[F^i, F^j]$ denotes the normalized cross correlation score between image patches generated from $F^i$ and $F^j$, and $s^o[F^i, F^j]$ denotes the normalized area of overlap between the two rectangles represented by $F^i$ and $F^j$. Each detected face is marked either as possible face, or tracked face, or as an unmatched face depending on its maximum similarity score. The unmatched faces are then added to possible faces list, while the life times and object template data for every possible and tracked faces are updated. Finally, matured faces from possible faces are moved to the tracked faces list, while disappeared faces are removed from the tracked faces list. This process at the end generates an updated set of tracked faces $F_t^1, \ldots, F_t^{n_t}$. The set of tracked faces is then passed in act 814 to a multi-person scheduling engine as described previously to prioritize multiple subjects for further processing and iris acquisition.

After detecting the subjects and generating tight regions around human body, embodiments determine the upper body region where face detection will be performed. This phase not only improves the performance of the overall system in terms of processing time, but also gets rid of false face-like regions being detected as faces on non-human areas. An embodiment scores the faces after they have been detected in upper human regions to further discard false faces. The scores are computed from three factors signifying how face being detected in foreground regions on top portion. The first factor computes the percentage of foreground pixels covered in the detected face region. The second factor computes its overlap with background pixels. The third factor computes the score based on spatial position of the detected face region with respect to human upper body region. Based on these individual scores, this embodiment also addresses the issue of multiple faces being detected inside a single human region. In such a situation, the best face is scored higher than others in the human region and all others are marked as false alarms. Finally, a threshold on the combined score is then applied and the faces below threshold are rejected from any further processing.

A particular embodiment performs face detection-based facial tracking in the scene imaging system 120. This embodiment adds a valid face (score above threshold) into list of possible faces to be tracked. If the face detection for region around this detection result keeps temporally stable for N frames, this face is moved to list of tracked faces and tracking keeps track of this face. The actual tracking is performed by data association between results of face detection and list of face in possible or tracked faces. This data association is performed based on area of overlap between the two faces being compared. If the area of overlap between the two faces is above a threshold, the detected face is associated to the current possible or tracked face being analyzed. An embodiment of the innovation uses template similarity between two faces for association. A combination of the region overlap and template similarity can also be used for this purpose.

Figure 10:
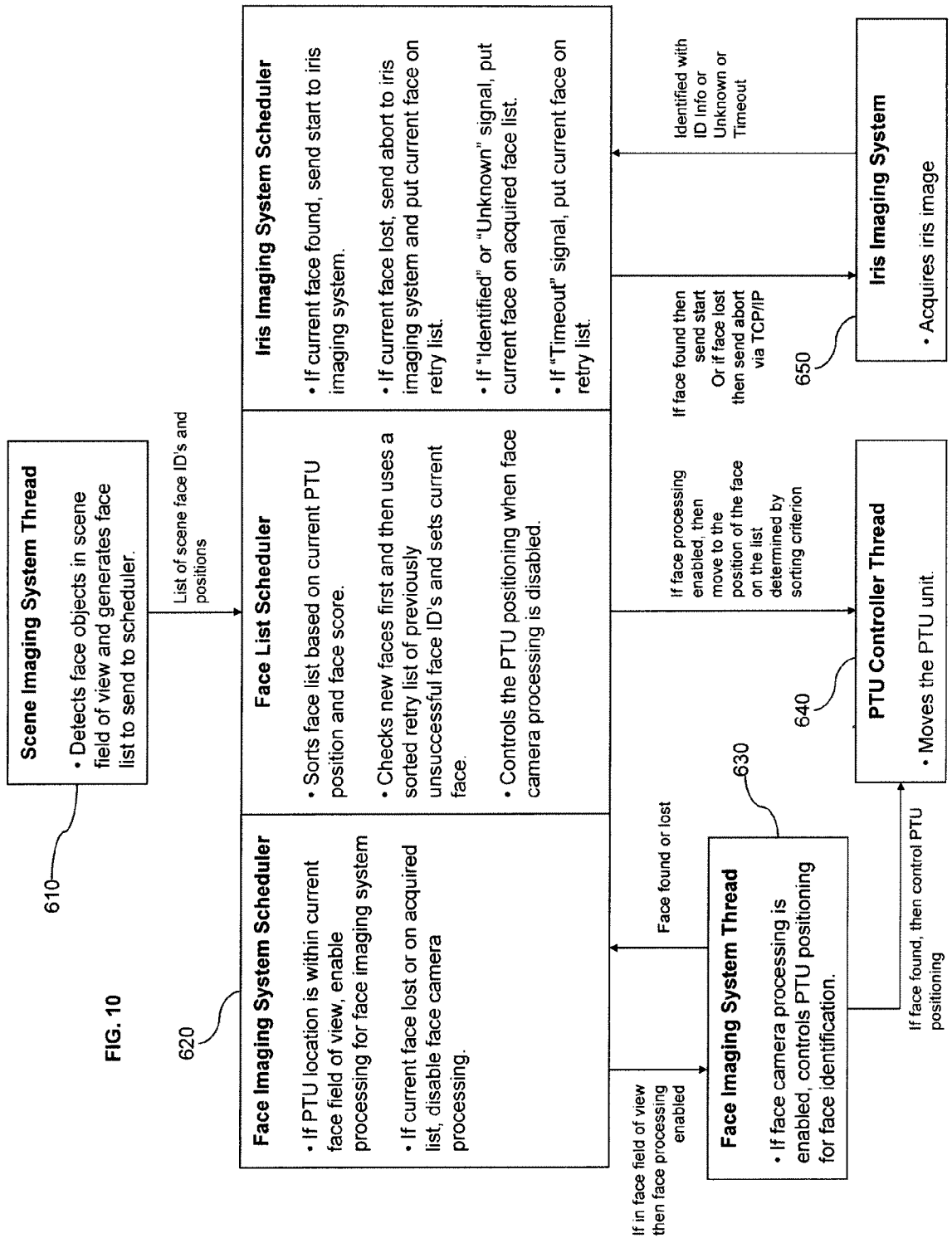
FIG. 10 illustrates operation of processing threads and aspects of the scheduler according to aspects of the present invention.

As described earlier, a scheduler fulfills aspects of a central control unit. FIG. 10 illustrates the operation of and aspects of the scheduler processing module. As shown in FIG. 10, a list of face detections is received from a scene imaging system processing thread 610. The scheduler 620 sorts the list into those associated with previous iris acquisitions and "active" scene detections. Active subjects are ranked and queued. The scheduler 620 directs the PTU 195 via the PTU controller processing thread 640 to the top ranked subject and activates the face imaging system processing thread 630. The scheduler 620 also activates the iris imaging system processing thread 650, when the face imaging system thread 630 detects a face. Iris acquisition signals are received by the scheduler 620 and displayed in a GUI display as a FIFO of acquisition results. Active scene detections are ranked according to the number of associated acquisition attempts and proximity to the current position of the PTU 195.

A subject-servo-loop may track both the motion of the PTU 195 and a target subject 10, for example as shown in FIG. 1. Frequent polling of the position of the PTU 195 is used to form a PTU motion model that estimates past and future positions and velocities of the PTU assembly. Eye tracking in the face field of view 104 is combined with range information using the rangefinder 189. Subject coordinates as measured within the face imaging system 140 are converted to pan and tilt angles relative to the live position of the PTU 195. The range of the target subject 10 is used for triangulation. Absolute pan and tilt angles are then calculated using an estimation of the position of the PTU 195 at the time at which the face imaging system 140 records the image. The PTU 195 is instructed to accelerate from its current pan and tilt velocities such that it will coincide with the subject at a future time. Any lag of the PTU 195 at the time of instruction is taken into account using "instruction epoch" estimates of the PTU 195 and positions and motions of the target subject 10.

Offline calibrations establish homographies between the face imaging system 140 and the iris imaging system 160. The PTU 195 is then targeted such that a subject's irises are centered in the iris imaging system 160. This may be achieved using two motion models. The first tracks the motion of the PTU 195. Live pan and tilt angles read at frequent intervals from the PTU 195 form a time based PTU motion model that is used to estimate past and future positions and velocities of the PTU 195. Eye detections recorded by the face imaging system thread and subject ranges sampled periodically using the rangefinder 189 are incorporated into a subject motion model. Pan p, tilt t, and range Z, are treated as three separate trajectories. Readings from the rangefinder 189 are used to record the subject's motion in the Z direction. A subject's (x, y) coordinate as measured within the face imaging system 140 are converted to pan and tilt angles relative to the live position of the PTU 195. The subject's range Z is used for triangulation. The PTU motion model is then used to estimate the position of the PTU 195 when the face imaging system 140 previously recorded the image corresponding to the current face imaging system processing results. The relative (p, t) angles are thus converted to absolute subject angles which are used to update a subject motion model that estimates pan and tilt angles, velocities, and accelerations of the subject 5. The PTU 195 is instructed to accelerate from its current pan and tilt velocities to new values such that it will coincide with the target at a future time T. Any lag of the PTU 195 at the time of instruction is taken into account using "instruction epoch" estimates of the PTU 195 and subject positions and motions.

A periodic signal (e.g. 30 Hz) is used to trigger a read of the PTU current positions ($p_{PTU}$, $t_{PTU}$) and velocities ($V_{PTU}^p$, $V_{PTU}^t$). If velocities are not available, as with some PTUs, velocities are inferred from sequential position readings. A high-precision computer system counter is used to record the time T of the request. PTU states defined as (T, $p_{PTU}$, $t_{PTU}$, $V_{PTU}^p$, $V_{PTU}^t$) are stored in a FIFO cache of results. The PTU control module asks the PTU 195 for its state at a particular epoch e. The PTU model calculates its state at time=e by linear interpretation betweens sequential states $T_1$ and $T_2$ in its cache where $T_1 < e$ and $e < T_2$. If no state exists in the models cache such that e<T then the model predicts the "future" state using:

$$p_{PTU}(n) = p_{PTU}(n-1) + V_{PTU}^p(n-1) * \Delta T + \frac{1}{2} a_{PTU}^p * (\Delta T)^2 \quad (12)$$

$$t_{PTU}(n) = t_{PTU}(n-1) + V_{PTU}^t(n-1) * \Delta T + \frac{1}{2} a_{PTU}^t * (\Delta T)^2 \quad (13)$$

$$V_{PTU}^p(n) = V_{PTU}^p(n-1) + a_{PTU}^p * \Delta T \quad (14)$$

$$V_{PTU}^t(n) = V_{PTU}^t(n-1) + a_{PTU}^t * \Delta T \quad (15)$$

where $\alpha_{PTU}^p$ and $\alpha_{PTU}^t$ are PTU pan and tilt accelerations=e−T(n−1). PTU pan and tilt accelerations are assumed to be constant in magnitude but reverse in sign depending on whether the latest instruction given to the PTU causes an acceleration or deceleration. In one embodiment the velocities are assumed linear and $a_{PTU}^p$ and $a_{PTU}^t$ are set to 0. In a second embodiment the magnitude of $a_{PTU}^p$ and $a_{PTU}^t$ are set to expectations based on the PTU configuration.

Estimations of absolute pan and tilt angles are recorded as discussed below. In a similar way to the PTU model, the target model are stores target states in a FIFO cache of results. Target states defined as time, pan and tilt coordinates, pan and tilt velocities and pan and tilt accelerations (T, $p_T$, $t_T$, $V_T^p$, $V_T^t$, $\alpha_T^p$ and $\alpha_T^t$). The time T is estimated as the time at which the face imaging system recorded the image corresponding to the latest eye detection results. Initially, instantaneous velocities $V_T^p$ and $V_T^t$ are calculated as $$V_T^p(n) = \frac{p_T(n) - p_T(n-1)}{\Delta T} \quad (16)$$

$$V_T^t(n) = \frac{t_T(n) - t_T(n-1)}{\Delta T} \quad (17)$$

and $\alpha_T^p$ and $\alpha_T^t$ remain unknown (i.e., not estimated) at the point. A smoothing function is used to re-estimate $V_T^p$ and $V_T^t$. In one embodiment an exponential decay is used to weight previous instantaneous velocities, in another pairs of instantaneous velocities, i.e. n and n−1, are weighted to calculate a smooth estimate. In the current embodiment:

$$V_T^p(n)^{smoothed} = \frac{V_T^p(n) - V_T^p(n-1)}{2} \quad (18)$$

As discussed below the PTU control model asks the target model for states as future epochs, e. In one embodiment target accelerations are not considered and linear velocities are assumed. Future positions and velocities of the target are calculated using the latest estimate of $V_T^p(n)^{smoothed}$. In a second embodiment estimations of target accelerations are made. Weighted combinations of past $V_T^p(n)^{smoothed}$ are used to estimate $\alpha_T^p$ and $\alpha_T^t$. The target model state is then estimated used equations analogous to equations (12) to (15) used in the PTU model.

When information (target pan and tilt angles relative the frame of reference of the face image as inferred from eye detection coordinates) from the face processing model reaches the PTU control module the PTU control module follows the following workflow.

1. The PTU model is asked for its state at the time at which the face image was recorded.
2. Calibrations then convert the pixel coordinates of the target's location (based on eye detection/tracking) into pan and tilt angles using triangulation based on pixel magnification and Z ranges information from the range finder.
3. Absolute target pan/tilt angles are calculated based on the PTU model's estimation of its position and the relative angle displacement of the target.
4. The target model is undated with the latest estimation of the target's position.
5. A PTU instruction is calculated that aims to change the current velocity of the PTU such that the subject and PTU coincide at a future time T. The magnitude of (T−$T_{current}$) is controlled to be equal to about the time between PTU instruction commands (T−$T_{current}$) can be increased to smooth out motion. In one embodiment the new velocity of the PTU is estimated using the calculated difference in position of PTU and target.

Solving simultaneous equations:

$$P_{future} = P_T + V_T * T \quad (19)$$

$$P_{future} = P_{PTU} + V_{PTU} * T \quad (20)$$

We get:

$$V_{PTU} = V_T + (P_T - P_{PTU})/T \quad (21)$$

The positions and velocities of the target and PTU are estimated at the time of instruction. In this way the predicted live error in PTU position is accounted for not the historical error as measures in the face image.

A second embodiment uses estimations of the target and PTU accelerations to calculate $V_{PTU}$.

The PTU 195 is instructed to change its velocity to match $V_{PTU}$.

At every face imaging system acquisition a signal is used to trigger a read of the target's current range Z using the rangefinder. Range velocity, is calculated as:

$$V_T^Z(n) = \frac{Z_T(n) - Z_T(n-1)}{\Delta T} \tag{22}$$

In one embodiment, a smoothing function is used to calculate $V_T^Z(n)$.

The zoom lens for the iris imaging system is controlled in much the same way as the PTU motion. The zoom and focus of the lens are set to coincide with the target's predicted future range $Z_T^{future}$ using the target models estimate of the targets range and range velocity. Assuming a constant but rapid magnitude of the motion of the zoom lens the zoom lens is instructed to change its zoom and focus planes to a plane where the target and zoom lens are expected to coincide based on the target model prediction of the targets current Z range and range velocity.

A sequence of offline calibration steps may be used to map the recorded positions of faces detected in the scene imaging system 120 to pan-tilt angles for the pointing of the PTU 195. The aim of this coarse human targeting is to rotate the PTU 195 such that the subject's face is within the face field of view 104. A single calibration target spanning, for example, 0.6 m×0.8 m is used to generate a polynomial mapping of x and y coordinates in the scene imaging system to pan and tilt angles respectively. Features on this calibration target are detected in the scene imaging system to yield the x and y coordinates in the scene imaging system for a specific location in the scene imaging system. The PTU is then manually rotated to center that particular feature in the face imaging system. The corresponding pan and tilt angles are then recorded. This process is repeated for multiple feature points on calibration target to generate pairs of (x, y) locations to pan-tilt angle mappings. Finally, a mapping from the set of (x, y) locations to the set of pan-tilt angles was learnt using polynomial fit. This function is used as the offline calibration between scene coordinates and PTU angles. An embodiment of this technique makes the manual process of PTU centering, automatic. This is accomplished by automatically detecting the feature points on the calibration target. This process first assumes that calibration target is visible in the face imaging system 140 when the PTU 195 is at its home position (pan and tilt angles of 0 degrees each). It moves the PTU 195 so the first feature point is centered in the face imaging system. The corresponding locations of scene imaging system coordinates and pan tilt angles for the feature are then recorded. The process records these pairs for all the features, and finally the mapping function between the scene imaging system coordinates and pan tilt angles is learnt. Another embodiment of this approach makes the whole process completely automatic without even the need for calibration target. A human subject is placed anywhere in the capture volume. The face is detected, and the PTU 195 is moved in small incremental steps to center that face in the face imaging system. Once the subject's face is centered in the face imaging system, the corresponding scene coordinates and pan-tilt angles are recorded. Then the subject is asked to move to another location in the capture volume and the same process is repeated. Finally, the plurality of these pairs of scene coordinates and corresponding pan-tilt angles are recorded and scene-face calibration is learnt from this data.

At the time of acquisition, the learnt calibration is applied to center the subject's face in face imaging system. This is followed by angle corrections terms based on an estimation of the distance to the subject, Z. To achieve this two further offline calibration steps were employed. Firstly, required angle offsets were mapped to Z by moving the calibration target through the complete Z range. Secondly, face detections at known Z distances were used to coarsely map detected face sizes with the distance to the subject.

A third calibration mapping is performed to map the subject's Z distance to the camera parameters for iris imaging system. The gain and exposure parameters of the iris imaging system are updated using this calibration during iris acquisition.

A fourth calibration is performed to map the subject's Z-distance to zoom and focus counts in the zoom lens for iris imaging system. This calibration is learnt by placing multiple targets in the capture volume, locating their Z-distance using the range-finder and noting the target's best in-focus number in terms of focus counts. Similar procedure is repeated for the zoom axis of the zoom lens. This calibration generates a set of Z-distance locations and its corresponding zoom- and focus-counts in the zoom lens. During iris acquisition phase, the zoom counts are backcomputed from the z-distance. The computed zoom counts are applied to the zoom lens to generate the image of iris with acceptable magnification factor. The same process is repeated for the focus axis of the zoom lens to generate the in-focus image of subject's iris.

Referring back to FIG. 12, the images, i.e., a video stream, captured by the face imaging system 140 are processed. The face imaging system 140 and the iris imaging system 160 are mounted on the PTU 195, which is initially pointed to the target subject 10 by the scheduler in act 816. Once the PTU 195 finishes its move towards the target subject, face processing is started. The face processing engine continuously tracks the mid-point between subject's eyes from face image stream in act 818. This track center is used in the subject servo loop for continuous human tracking. This involves continuous frontal face detection, and detection and tracking of both eyes.

The system for face image acquisition is designed to produce the subject face size as large as vertical resolution of the face imaging system at a minimum standoff distance, e.g., 3 meters. Embodiments use the face classifier trained on Haar-like features using Ada-Boost for feature selection. The face detector returns a set of faces from the face image stream, which includes occasional face false alarms. Embodiments reject the face false alarms through a face scoring mechanism. Detected faces may be scored as:

$$S_i = \alpha^E S_i^E + \alpha^\theta S_i^\theta + \alpha^C S_i^C$$

$$\alpha^E + \alpha^\theta + \alpha^C = 1 \tag{23}$$

where score factor based on number of eyes is:

$$S^E = \exp\left\{\frac{(N^E - 2)^2}{2\sigma_E^2}\right\} \tag{24}$$

which results in maximum score when two eyes are detected and decreases the score for the face for which less (misses) or more (false alarms) eyes are detected. The head angle from the detected eyes is computed as the angle subtended by the line connecting the center of two eye regions. Embodiments have pan, tilt and zoom/focus capabilities, but there may be no rotational mechanism. This means that if the subject rotates their head, the iris images formed at the dual-eye iris image sensor will be cut-off. So, the face scoring factor based on face angle reduces the score on such a face as:

$$S^\theta = 1 - \frac{\hat{\theta}}{\theta_{max}} \quad (25)$$

$$\hat{\theta} = \begin{cases} \theta^E, & \theta^E \leq \theta_{max} \\ \theta_{max}, & \theta^E > \theta_{max} \end{cases}$$

where $\theta_{max}$ is limited to $\pm 10°$. After each face has been scored, the face with highest score which is above a threshold is processed for target point tracking towards iris acquisition. This scoring mechanism helps not only reject the face false alarms, but also the maximum value of this score gives the best face candidate for iris acquisition. Once a face candidate with face score above a threshold is detected in the face imaging system, the face processor state is switched to found. The state of face processor stays at found until a face is successfully detected and target point stably tracked on the subject's face. The face processor state switches to lost when either the subject turns away or iris acquisition completes successfully for the subject.

Once the best candidate face is available in the image, embodiments locate the target point on subject face. The target point is defined as the point mid-way between two eye regions. Stability of this point during iris acquisition directly results in stable iris images being streamed to the dual iris camera for example. Thus, accurate target point detection and stable target point tracking are of utmost importance for successful iris acquisition. Towards this end, multiple approaches for detection and tracking of both eyes in challenging imaging conditions may be implemented. Furthermore, these multiple approaches of detection and tracking are integrated in a seamless way.

Eye location errors may significantly affect the face recognition accuracy. The error in eye localization is further compounded in our problem of iris recognition at large distances. The stringent requirements imposed by long range iris acquisition dictate that a 5 pixel shift in the face camera eye coordinates will throw off the iris image. Embodiments address the problem of eye detection using Haar-like features in a cascade of classifiers with feature selection through AdaBoost. In the larger context of generic object detection, there is a dichotomy of approaches for selection of positive regions. One approach is to select only the "core" object region for training; this is referred to as the object-centric training. The other approach is to use an expanded region centered on the object for training; this is referred to as expanded-object training. The later approach has advantages in video surveillance applications, where objects to be detected often appear small and suboptimally imaged. Including some portions of meaningful object region around, but at the same time minimizing the unnecessary background region from training is the key to better object detection in these scenarios. Embodiments use the expanded-object training for eye detection. The training is done separately for each eye. For training, embodiments mark the region of eye box including the eye-brows. This expanded area includes more details from people with eye-wear, etc. This also keeps the high-level contextual appearance of eyes intact. Embodiments use a labeled set of approximately 1000 positive training set images for each eye. For the negative training set images, embodiments use the image strips cropped from the face and background areas of images that do not include the eye regions. Also, images from non-eye objects and scenes may be used as a negative training set. Approximately the number of negative images used in training may be an order of magnitude more than the number of positive images. Separate cascaded classifiers for each eye are learnt using Haar-based features. The classifiers learnt for each eye are used for eye detection inside each face region. Each eye is detected in the respective upper quadrant of the face region. The detected set of eyes is used for face scoring as in Eq. (24). If one left and one right eye is detected, then the face rotation angle is also computed for scoring as in Eq. (25).

Although the eye detector is used as the default method, successful eye detection is never guaranteed at every frame. To fill in the temporal gaps left by the eye detector, embodiments employ eye tracking using mean-shift analysis. Here, embodiments address two basic problems inherent in the generic mean-shift tracking. The first problem is that of object scale; as the face is initially detected at larger distance, the face and correspondingly eyes are of smaller size. As the subject moves closer to the imaging system, eyes start getting larger. The original mean-shift process does not address the object scale problem in a theoretically sound manner Embodiments address this issue by estimating the true object scale change through inter-frame scale variation of subject's face. Embodiments also take care of sudden large shifts in object location from previous frame to the current frame. The second problem is that of object model drift; under excessive image variations, the tracker result tends to drift away from original object location. This is taken care of by introducing the prior probability on object location. This prior probability is estimated by warping the eye detection location of the most recent successful detection, to the current frame face region. This warped eye region gives the best estimate of our prior belief about the object's location in the current frame, which is refined by the mean-shift iterations. By integrating the scale change as well as the prior probability distribution of object location in the mean-shift framework, embodiments provide a robust eye tracker which takes care of sudden and gradual object scale and translation changes as well as keeping the object drift problem in check. The process for mean-shift eye tracking is provided by TABLE 2.

TABLE 2

MeanShift_EyeTrack

Input: $y_0$: Initial eye location from previous frame.
$\langle F, E_D \rangle^{n-d}$: Face and detected eye region from frame with most recent successful eye detection.
$\langle F, E_S, E_X \rangle^{n-1}$: Face, eye search and detected/tracked eye regions from the previous frame.
$\langle F, E_S \rangle^n$: Face and eye search region from current frame
Output: $\langle E_T \rangle^n$: Tracked eye region for current frame
1. Estimate inter-frame eye translation and scaling using eye search regions. Refine initial eye location:
$\hat{y}_0 = S \cdot y_0 + T$
2. Warp detected eye region at frame n − d to face region in current frame n for prior probability distribution
3. Initialize object data for eye using initial eye coordinates $\hat{y}_0$.
Compute Kernel-weighted histogram:

$$\hat{q}_u = \frac{1}{\sum_{i=1}^{N} k(\|x_i^*\|^2)} \sum_{i=1}^{N} k(\|x_i^*\|^2) \delta[b(x_i^*) - u]$$

where $k(x) = \frac{1}{\sqrt{2\pi}} \exp\left(-\frac{1}{2}x^2\right)$

TABLE 2-continued

MeanShift_EyeTrack

4. Derive Mean-shift weights image with prior probability weighting:

$$w_i = \sum_{u=1}^{m} \sqrt{\frac{\hat{q}_u}{\hat{p}_u(\hat{y}_0)}} \, \delta[b(x_i - u)] \times g\left(\left\|\frac{\hat{y}_w - x_i}{h}\right\|^2\right)$$

5. Find next location of target candidate:

$$\hat{y}_1 = \frac{\sum_{i=1}^{n_h} x_i w_i g\left(\left\|\frac{y_0 - x_i}{h}\right\|^2\right)}{\sum_{i=1}^{n_h} w_i g\left(\left\|\frac{y_0 - x_i}{h}\right\|^2\right)}$$

6. If $\|\hat{y}_1 - \hat{y}_0\| < \epsilon$ Stop
else Set $\hat{y}_0 \leftarrow \hat{y}_1$. Go to Step 3.

It has been proved that the mean-shift process converges to a local mode in the posterior distribution of object location within a few iterations. Experiments have shown that the modified mean-shift eye tracker of the present embodiments converges to the true eye location within less than 4 iterations in most circumstances.

Another challenge in stable target point tracking arises due to uneven ambient illumination. The surface structure of human face causes gray-scale saturation on one side of the face, and heavy shadows on the other, in the case of uneven illumination on subject's face. This situation is of practical importance because in those regions of space where face is unevenly lit, eye detection might fail for one side of the face. Embodiments tackle this situation by proposing an adaptive eye template matching based on normalized cross correlation. This approach is automatically started in case of one eye being detected and/or tracked successfully, but a failure of detection and tracking on the other eye. The adaptive eye template is generated from the found good other eye. This template is then geometrically mirrored to represent the template being searched for the other eye. Normalized cross-correlation trials are performed at all locations in the eye search region. The location that generates the maximum normalized cross correlation score above a minimum threshold is taken as the new eye location for this side of the face.

The above three approaches for accurate eye detection and stable eye tracking are weaved into a single eye processing framework. To this end, a novel binary decision tree framework may be employed. The leaves of the decision tree are the states for the eye processing framework. The intermediate nodes are individual processing algorithms applied to the current frame. At the start of eyes processing for each frame, the state starts in "NONE." The binary tree is parsed until one of the leaf nodes is reached. At any node in the tree, the algorithm represented by the node is executed. The result of that eye processing is checked to see if the operation succeeded or not. If the process succeeds, then the left child of the tree is executed next; otherwise, the right child of the tree is executed. The process stops when leaf node is hit. At that time, the best results from eye processing are returned. In the particular binary decision tree shown, first Haar-based eye detection is performed in the eye search region. If the eye detection process succeeds, then tracker initialization is performed which includes object model update for the tracker. Next the state of the eye processor is switched to "NONE" so the next iteration starts in the top node of the tree. If Haar-based eye detection fails, then eye processor starts eye tracking, which only tracks if the initialization has been performed previously. The results of tracking are checked for any tracker failures, including drift and degenerative scale change. If the tracking process fails to track the eye, then the next and final node is executed. This node tries to locate the eye in the current search region if the other eye from this frame has been successfully detected or tracked. If this node succeeds, then tracker initialization is performed and state is switched back to "NONE." This framework guarantees accurate eye detection at every frame based on Haar-based detection. In case of failure, the efficient Mean-shift tracking is performed. If that too fails, and one eye has been detected, then normalized cross correlation-based eye localization is used. This integrated process generates more stable eye localization at every frame being processed. The eye regions for both eyes localized using the integrated detection and tracking approach are used to compute and track the target point on subject's face. The target point location at each frame is then passed to PTU processing module, which keeps on updating the pan and tilt angles of the PTU in a servo loop to keep the subject's irises in the field of view of iris imaging system.

Pixels in the scene imaging system are mapped to pan and tilt angles for the PTU such that objects located in the scene image are centered in the PTU camera's image. A manual calibration places targets at various points in the 3D volume visible in the scene imaging system. Each target is centered in the PTU camera via the manual pointing of the PTU. An interactive automated search for a target is an alternative. The required pan/tilt angles corresponding to each (x, y) position in the scene field of view are noted. A mapping function that calculates an pan/tilt pair for each (x, y) is calculated.

In the preferred embodiment the x to pan and y to tilt functions are treated separately and two one dimensional polynomials are used to map x to pan and y to tilt. In an alternative embodiment a large calibration target is placed within a single plane perpendicular to the optical axis of the scene imaging system. Pan/tilt angles corresponding to each (x, y) pair on this target are recorded at polynomial mappings from x to pan and y to tilt are calculated from this data. The calibration target is then placed at various distances from the scene imaging system. At each distance the polynomial mappings are used to predict the pan and tilt angles for the target. The errors in predicted pan and tilt angles are recorded for the target at different distances from the scene imaging system. Mappings that predict pan and tilt errors as a function of distance are calculated. Accurate PTU pointing is achieved for a object at (x,y) in the scene imaging system by using a combination of the pan and tilt predicted by the single plane calibration and the estimated pan and tilt errors based the calibration of these errors with distance. The distance to the object in the scene is either inferred by the size of the appearance of the object in the scene image of by rangefinder pointing at the object. In the case of the face in the scene image the size of an ROI calculated during face detection is mapped to an estimate of its distance from the scene imaging system. This mapping is calculated from data recorded from different people standing at different distance from the scene imaging system.

Once the face imaging system is pointed to the targeted portion of the volume with the help of scheduling process and pan-tilt controller in act 816, face imaging system processing is started. Faces are detected in face image stream using the face sizes based on relative magnification between face and scene imaging systems. A hypothesized search region for eye detection is formed within detected face regions of each detected face. Eye detection is then performed in the eye search region. An embodiment of the presented innovations performs eye detection using a cascade of Haar-like features from training set human eye image regions. Dominant features are selected using Ada-boost method to generate a strong set of cascaded classifiers based on weak classifiers learnt during training Embodiments generate an extended set of human eye region training set from marked up images and generated through a boot-strap process. Another embodiment of the eye detection technique processes weighted texture-intensity images instead of only intensity images. This method has the advantage of modeling the texture of the eye region along with its intensity signature. Yet another embodiment of the eye detection technique performs eye detection in binary image regions. The binary image regions corresponding to eye search regions are produced through a thresholding process. The threshold for binarization can be obtained either from Otsu's algorithm or through detection of peaks and valleys in histogram from eye search region. Once a binary image has been obtained, horizontal and vertical projection is performed to generate the dominant modes in horizontal and vertical projection vectors. From this, the individual components corresponding to eyeball and eyelid are separated. The component with highest probability of belonging to eyeball is identified. The center of the eye region is then computed based on best eyeball component. In some situations of system placement, it can so happen that the visible ambient illumination on the targeted person's face is uneven. This can cause one side of the face more illuminated that the other. The preferred embodiment of this innovation addresses this situation. If one of the eyes is detected through eye detection process and the other is not, the embodiment with one-eye mitigation is started. This process generates a dynamic template of the eye to be found from detected eye. It flips the found eye and searches for the other eye in opposite eye search region. This search is performed through normalized cross correlation. Another problem that is addressed in the preferred embodiment is missed detection across frames. If an eye is detected in one frame and it fails to be detected in the next frame, an eye tracking process is launched. The tracking of eyes in successive frame is performed by updating the template at each step based on detection results and tracking in the next frame if detection is unsuccessful. The tracking is performed using meanshift tracking process with the results of face and eye detection for scale adjustment. The difference with the prior art here is that face and eye detection results are integrated in meanshift tracking process for stable eye tracking across scale changes.

After eye detection and tracking results are generated, the detected faces are scored to reject false alarms. The face scoring mechanism here takes into account the number of eyes detected for each face and degrades the scores of faces with false or missed eyes. The best face from face field of view is selected based on these scores for targeting to acquire face and iris biometrics. From the targeted face, the location of nose-bridge is computed as the unique equidistant point between the centers of two eyes. Finally, a smoothing operation is performed on the targeted point across frames. An embodiment performs a moving average filter smoothing. Kalman filter can also be used for smoothing in this step.

The iris and face imaging systems have a fixed alignment. An object pixel, $(x_o, y_o)$, in the face imaging system's image is inferred from the detection of a subject's face and/or eyes in the face imaging system's image. In one embodiment it is the center point of a line joining the calculated centers of each eye. The face-iris calibration defines a target pixel, $(x_t, y_t)$, such that if the object pixel is at $(x_t, y_t)$, then the subject's irises will be centered in the iris imaging system. For a target at a particular position and distance from the cameras a pixel offset $(x_{offset}, y_{offset})$ is measured. Using a calibration of the face imaging system's pixel magnification with object distance away, this offset is mapped through the expected range in object distances. Therefore, during system targeting a target pixel $(x_t, y_t)$ is calculated based on an assessment of the subjects distance away (via a rangefinder reading or inferred from the object's size). The PTU is then moved to minimize the distance between object pixel, $(x_o, y_o)$, and target pixel, $(x_t, y_t)$, as described elsewhere. This is repeated for each frame during face image processing.

As shown previously in FIGS. 1 and 6, the iris imaging system 120 is mounted on the pan-tilt unit which is constantly moved in pan and tilt directions to keep the target point on subject's face centered. The iris acquisition processing is turned on in act 820 when the face processing state switches to found. At this stage, the laser illumination is turned on to illuminate the subject's face region in NIR illumination. The calibration and targeting steps performed as part of the subject servo loop keep the iris image within the iris imaging system field of view. The estimate of subject's distance with the acquisition system is used in the zoom-focus processing for iris lens control. The focus plane is moved to the subject's z-location in the capture volume. Given the subject's Z-location and the diameter of an average person's iris, the magnification factor is computed. The computed magnification factor is then applied to zoom in the subject's iris in order to maintain the required pixel resolution on the iris. At this stage, iris acquisition process is started. Embodiments provide an enterprise application architecture where various components of the system can be deployed on multiple processing units. The individual multi-threaded applications can interact with each other through TCP/IP interface to communicate results. The architecture uses the distributed computing architecture to achieve maximum performance gains. The iris acquisition and recognition module is controlled by the scheduler process in this architecture. The iris acquisition process performs segmentation of the given iris image to isolate the textured area of iris region. If the segmentation process succeeds, then some quality measures are computed from the segmented iris image. These quality measures include focus measure score to estimate the sharp details in iris region. This measure helps us reject the blurred iris images. The second quality measure computed is the coverage measure score. This measure helps us reject the iris images with heavy eyelid or eyelash occlusion. A set of iris images that pass the thresholds on the above two quality measures is stored in system's cache memory. Once enough number of iris images have been captured, the iris acquisition process stops. The segmented iris region from each acquired image is then encoded into an iris signature bit pattern. This bit-pattern is then matched against all such bit-patterns stored in the database. Finally, if the subject's iris bit-pattern matches with any of the stored patterns, a match is declared. The enrolled identity of the subject from database is communicated back to the processing unit.

As described above, the controller 190 may be a programmable processing device, such as an external conventional computer or an on-board field programmable gate array (FPGA) or digital signal processor (DSP), that executes software, or stored instructions. In general, physical processors and/or machines employed by embodiments of the present invention for any processing or evaluation may include one or more networked or non-networked general purpose computer systems, microprocessors, field programmable gate arrays (FPGA's), digital signal processors (DSP's), micro-controllers, and the like, programmed according to the teachings of the exemplary embodiments of the present invention, as is appreciated by those skilled in the computer and software arts. The physical processors and/or machines may be externally networked with the image capture device, or may be integrated to reside within the image capture device. Appropriate software can be readily prepared by programmers of ordinary skill based on the teachings of the exemplary embodiments, as is appreciated by those skilled in the software art. In addition, the devices and subsystems of the exemplary embodiments can be implemented by the preparation of application-specific integrated circuits or by interconnecting an appropriate network of conventional component circuits, as is appreciated by those skilled in the electrical art(s). Thus, the exemplary embodiments are not limited to any specific combination of hardware circuitry and/or software.

Stored on any one or on a combination of computer readable media, the exemplary embodiments of the present invention may include software for controlling the devices and subsystems of the exemplary embodiments, for driving the devices and subsystems of the exemplary embodiments, for enabling the devices and subsystems of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, and the like. Moreover, parts of the processing of the exemplary embodiments of the present inventions can be distributed for better performance, reliability, cost, and the like.

Common forms of machine-readable media may include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present invention has been described in connection with a number of exemplary embodiments, and implementations, the present inventions are not so limited, but rather cover various modifications, and equivalent arrangements.

What is claimed is:

1. A system for capturing biometric data from a subject, comprising:
    a first imaging system having a first field of view and capturing at least one first image in which a subject is detected;
    a second imaging system having a second field of view;
    a third imaging system having a third field of view; and
    an adjustment system coupled to the second imaging system and the third imaging system, the adjustment system being movable according to a position of the subject detected in the first field of view, movement of the adjustment system causing the subject to be positioned in at least one of the second field of view and the third field of view, the second imaging system capturing at least one second image from the subject when the subject is positioned in the second field of view, and the third imaging system capturing at least one third image from the subject when the subject is positioned in the third field of view, the at least one third image being determined from the at least one second image and providing biometric data for the subject.

2. The system according to claim 1, wherein the adjustment system pans about a vertical axis of rotation and tilts about a horizontal axis of rotation.

3. The system according to claim 2, wherein (x, y) positions for pixels in the first field of view of the first imaging system are mapped to pan angles about the vertical axis of rotation and tilt angles about the horizontal axis of rotation such that the (x, y) positions are positioned in the second field of view of the second imaging system.

4. The system according to claim 1, wherein the second imaging system is in fixed alignment with the third imaging system.

5. The system according to claim 1, wherein the adjustment system includes a movable support on which the second imaging system and the third imaging system are disposed.

6. The system according to claim 1, further comprising an illuminator that propagates an illumination beam, the illuminator being coupled to the adjustment device, the movement of the adjustment system causing the illumination beam to be directed at the subject.

7. The system according to claim 6, wherein the illuminator propagates the illumination beam according to a vertical direction and a horizontal direction, the vertical direction and the horizontal direction being independently adjustable to move the illumination beam.

8. The system according to claim 6, wherein the illuminator is a laser illuminator that propagates a collimated beam having a substantially uniform illumination profile over a distance to the subject.

9. The system according to claim 1, wherein the subject is one of a plurality of subjects detected in the first field of view, and the adjustment system is moved in a sequence according to the position of each subject to position each subject in at least one of the second field of view and the third field of view, the sequence being determined by a scheduler.

10. The system according to claim 9, wherein the scheduler determined the sequence according to one of physical characteristics, behavioral characteristics, and other biometric characteristics of the plurality of subjects.

11. The system according to claim 1, wherein the first imaging system captures images of a fixed scene.

12. The system according to claim 11, wherein the first imaging system includes a plurality of cameras substantially overlapping and the first field of view is 360-degrees.

13. The system according to claim 1, wherein the second field of view is smaller than the first field of view, and the third field of view is smaller than the second field of view.

14. The system according to claim 1, wherein the third imaging system includes dual sensors.

15. The system according to claim 14, wherein the dual sensors reside on a single printed circuit board.

16. The system according to claim 14, wherein the dual sensors are spaced according to a pupillary distance between the subject's eyes.

17. The system according to claim 14, wherein the dual sensors capture iris images from the subject, and the iris images contain biometric data.

18. The system according to claim 14, wherein the third imaging system further includes an imaging lens and two beam splitters disposed at an imaging plane of the imaging lens, the beam splitters splitting the eye images and sending each eye image to a corresponding one of the dual sensors.

19. The system according to claim 18, wherein the third imaging system further includes relay lenses modifying a magnification of the eye images for the dual sensors.

20. The system according to claim 14, wherein the third imaging system further includes an imaging lens and a motorized lens that modifies a focus of the imaging lens.

21. The system according to claim 14, wherein the third imaging system further includes a rangefinder, and a long focal length zoom lens used in combination with the dual sensors, the zoom lens being controlled according to the rangefinder.

22. The system according to claim 14, wherein the third imaging system further includes at least one illumination source providing illumination for the subject's eyes.

23. The system according to claim 22, wherein the illumination has near-infrared wavelengths in the range of approximately 700 nm to approximately 950 nm.

24. The system according to claim 14, wherein the third imaging system includes a focal length zoom lens used in combination with the dual sensors.

25. The system according to claim 1, wherein the second imaging system captures a plurality of facial images from the subject, the plurality of facial images providing eye tracking information for the subject, and the third imaging system captures eye images from the subject, the eye images providing biometric data.

26. The system according to claim 25, wherein the third imaging system captures iris images from the subject, the iris images providing biometric data.

27. The system according to claim 25, wherein the subject's eyes are centered in the third imaging system.

28. The system according to claim 25, wherein a subject-servo-loop tracks the movement of the adjustment system and a motion of the subject, the adjustment system being moved according to the motion of the subject to allow the second imaging system to capture the plurality of facial images and the third imaging system to capture the eye images.

29. The system according to claim 28, wherein position data from the adjustment system is determined according to a frequency and provides input for a time-based movement model that estimates past and future positions and velocities for the adjustment system.

30. The system according to claim 25, further comprising a rangefinder, wherein the adjustment system is further coupled to the rangefinder, the movement of the adjustment system causing the rangefinder to be directed at the subject, and the rangefinder provides range information that is used in combination with the eye tracking information to model the motion of the subject, the range information indicating the motion of the subject in a z-direction and the eye tracking information indicating the motion of the subject in x, y-directions.

31. The system according to claim 25, wherein the third imaging system includes a camera and a long focal length zoom lens, a focus of the camera and a zoom of a camera being controlled to match the motion of the subject.

32. The system according to claim 25, further comprising at least one set of stereo cameras, wherein the at least one set of stereo cameras provides range information that is used in combination with the eye tracking information to model the motion of the subject, the range information indicating the motion of the subject in the z-direction and the eye tracking information indicating the motion of the subject in the x, y-directions.

33. The system according to claim 32, wherein the at least one set of stereo cameras includes a plurality of stereo cameras based on a volume of the first field of view, the plurality of stereo cameras being separated and having a magnification according to a distance to the subject.

34. A system for capturing biometric data a subject, comprising:
a first imaging system capturing at least one first image and detecting a subject;
a second imaging system being movable to track the subject and capturing at least one facial image from the subject;
a third imaging system including dual sensors, the third imaging system determining a position of the subject's eyes in the at least one facial image and the dual sensors capturing eye images from the subject, the eye images containing biometric data.

35. The system according to claim 34, wherein the dual sensors reside on a single printed circuit board.

36. The system according to claim 34, wherein the dual sensors are spaced according to a pupillary distance between the subject's eyes.

37. The system according to claim 34, wherein the dual sensors capture iris images from the subject, and the iris images contain biometric data.

38. The system according to claim 34, wherein the third imaging system further includes an imaging lens and two beam splitters disposed at an imaging plane of the imaging lens, the beam splitters splitting the eye images and sending each eye image to a corresponding one of the dual sensors.

39. The system according to claim 38, wherein the third imaging system further includes relay lenses modifying a magnification of the eye images for the dual sensors.

40. The system according to claim 34, wherein the third imaging system further includes an imaging lens and a motorized lens that modifies a focus of the imaging lens.

41. The system according to claim 34, wherein the third imaging system further includes a rangefinder, and a long focal length zoom lens used in combination with the dual sensor camera, the zoom lens being controlled according to the rangefinder.

42. The system according to claim 34, wherein the third imaging system further includes at least one illumination source providing illumination for the subject's eyes.

43. The system according to claim 34, wherein the illumination has near-infrared wavelengths in the range of approximately 700 nm to approximately 950 nm.

44. A product comprising a non-transitory machine-readable medium containing instructions for determining biometric data from one or more subjects, the instructions when executed by the machine comprising the acts of:
receiving a plurality of scene images from a first field of view, each scene image including a background image and a foreground image, the foreground image containing one or more subject images, the one or more subject images including eye images having biometric data corresponding to one or more subjects;
detecting, in each scene image, the foreground image relative to the background image;
detecting, in each scene image, the one or more subject images in the foreground image;
detecting facial images corresponding to the one or more subject images;
tracking, in the plurality of scene images, the detected facial images corresponding to the one or more subject images;

scheduling the tracked facial images for acquisition of the biometric data;

directing a second field of view to the tracked facial images according to the act of scheduling;

receiving the tracked facial images from the second field of view;

locating the eye images in the tracked facial images from the second field of view;

receiving the located eye images from a third field of view; and detecting the biometric data in the detected eye images from the third field of view.

45. The product according to claim 44, further comprising computing, in each scene image, the background representation of the scene.

46. The product according to claim 44, wherein the plurality of scene images represent movement of the one or more subjects through the first field of view.

47. The product according to claim 44, wherein the act of detecting the foreground image comprises modeling the background image according to per-pixel statistics associated with the plurality of scene images and detecting a binary foreground image in each scene image based on the modeled background image.

48. The product according to claim 47, wherein the act of modeling the background comprises:

determining a first-layer background image by repeatedly updating a first of the plurality of scene images with subsequent scene images;

applying binary thresholding to the first-layer background image to generate a first-layer mask image; and determining a second-layer background image by repeatedly updating the first of the plurality of scene images with the subsequent scene images in combination with the first-layer mask, and the act of detecting a binary foreground image comprises:

detecting first foreground pixels in each scene image that differ from the first-layer background image by a predetermined threshold;

detecting second foreground pixels in each scene image that differ from the second-layer background image by the predetermined threshold; and combining the first foreground pixels and the second foreground pixels.

49. The product according to claim 48, wherein the acts of updating comprise applying training phase learning rate parameter for a first N scene images and a detection phase learning rate parameter after the first N scene images.

50. The product according to claim 49, wherein the training phase learning rate parameter and the detection phase learning rate parameter are different but fixed preset global values for the entire background image at different layers.

51. The product according to claim 49, wherein the training phase learning rate parameter and the detection phase learning rate parameter are per-pixel variables adaptively updated based on the one or more subject images, the detected facial images, and the tracked facial images.

52. The product according to claim 44, wherein the act of detecting the one or more subject images comprises:

generating a horizontal projection histogram and a vertical projection histogram in the foreground image;

determining at least one first mode corresponding to the horizontal projection histogram, the at least one first mode having a first width greater than a first minimum width threshold and a first maximum projection count greater than a first minimum height threshold;

determining at least one second mode corresponding to the vertical projection histogram, the at least one second mode having a second width greater than a second minimum height threshold and a second maximum projection count greater than a second minimum width threshold;

determining one or more regions corresponding to one or more subject images in the foreground image according to Cartesian product of the at least one first mode corresponding to the horizontal projection histogram and the at least one second mode corresponding to the vertical projection histogram; and performing width and height adjustments for the one or more regions.

53. The product according to claim 44, wherein the act of detecting a facial image in the one or more subject images comprises applying a face classifier trained on a plurality of features with a feature selection algorithm.

54. The product according to claim 53, wherein the act of applying a face classifier trained on a plurality of features with a feature selection algorithm comprises applying a face classifier trained on Haar-like features with Ada-boost for feature selection.

55. The product according to claim 44, wherein the act of detecting facial images corresponding to the one or more subject images comprises:

generating a list of potential facial regions for the one or more subject images;

scoring the potential facial regions; and retaining, as the facial images, the potential facial regions that score above a predetermined threshold.

56. The product according to claim 55, wherein the act of scoring the potential facial regions comprises scoring the potential facial regions according to probabilities that the potential facial regions correspond with the facial images.

57. The product according to claim 56, wherein the act of scoring the potential facial regions comprises scoring the potential facial regions according to at least one of a first overlap of the potential facial regions with the foreground image, a second overlap of the potential facial regions with the background image, and a spatial position of the potential facial regions relative to the one or more subject images.

58. The product according to claim 56, wherein the act of scoring the potential facial regions further comprises scoring multiple potential facial regions corresponding to a single subject image.

59. The product according to claim 58, wherein the act of scoring multiple potential facial regions corresponding to a single subject image comprises weighting the multiple potential facial regions according to at least one of a first overlap of the multiple potential facial regions with the foreground image, a second overlap of the multiple potential facial regions with the background image, and a spatial position of the multiple potential facial regions relative to the one or more subject images.

60. The product according to claim 56, wherein the act of scoring the potential facial regions comprises weighting the potential facial regions according to a correspondence between the potential facial regions and facial regions being tracked in previous scene images.

61. The product according to claim 55, wherein the act of scoring the potential facial regions comprises scoring the potential facial regions according to a detection of eyes in the potential facial regions.

62. The product according to claim 44, wherein the act of tracking the facial images comprises tracking the facial images that appear in a predetermined minimum number of scene images.

63. The product according to claim 44, wherein the act of tracking the facial images comprises tracking the facial images that provide a frontal profile.

64. The product according to claim 44, wherein the act of tracking the facial images comprises tracking the facial images according to a probabilistic data association for the one or more subjects in the plurality of the scene images.

65. The product according to claim 64, wherein the act of tracking the facial images comprises:
   determining a first set of detected facial images from a currently processed scene image;
   determining a second set of potential facial images from previously processed scene images;
   determining a third set of tracked facial images from previously processed scene images;
   determining a first similarity between the first set of detected facial images and the second set of potential facial images;
   generating a second similarity between the first set of detected facial images and the third set of tracked facial images;
   marking the detected facial images from the currently processed scene image as a potential facial image, a tracked facial image, or an unmatched facial image according to the first similarity and the second similarity;
   adding the detected facial images marked as a potential facial image to the second set of potential images for processing of subsequent scene images;
   moving matured potential images from the second set of potential images to the third set of tracked facial images, the matured potential images being in the second set of potential images for a minimum number of scene images; and
   removing disappeared tracked facial images from the third set of tracked facial images, the disappeared tracked facial images being in the third set of tracked facial images but not in the first set of detected facial images.

66. The product according to claim 44, wherein the act of locating eye images in the tracked facial images comprises detecting the eye images according to one or more classifiers trained on a plurality of features with a feature selection algorithm.

67. The product according to claim 66, wherein the act of detecting the eye images according to one or more classifiers comprises applying a face classifier trained on Haar-like features with Ada-boost for feature selection.

68. The product according to claim 66, wherein the act of detecting the eye images according to one or more classifiers comprises applying one or more classifiers trained from expanded-object training.

69. The product according to claim 44, wherein the act of locating eye images in the tracked facial images comprises tracking the eye images.

70. The product according to claim 69, wherein the act of tracking the eye images comprises applying mean shift analysis.

71. The product according to claim 70, wherein the act of tracking the eye images further comprises estimating an object scale change via inter-frame scale variation of the corresponding facial image.

72. The product according to claim 70, wherein the act of tracking the eye images further comprises determining a prior probability of object location by warping an eye location corresponding with a most recent eye detection to a current detected facial image.

73. The product according to claim 44, wherein the act of locating eye images in the tracked facial images comprises determining a location for a second eye after a first eye has been detected.

74. The product according to claim 73, wherein the act of determining a location for a second eye comprises applying adaptive eye template matching based on a normalized cross section.

75. The product according to claim 44, wherein the act of locating eye images in the tracked facial images comprises applying a binary decision tree framework applying at least one of an adaptively determined sequence of Haar-based eye detection, an adaptive template-based eye detection, and a mean-shift-based eye tracking.

76. The product according to claim 44, wherein detecting the biometric data in the detected eye images comprises segmenting iris images in the detected eye images, the iris images containing the biometric data.

77. The product according to claim 76, wherein the act of detecting iris images in the detected eye images further comprises selecting the segmented iris images according to a focus measure and a coverage measure for the iris images.

78. The product according to claim 76, further comprising encoding the segmented iris images into an iris signature bit pattern and matching the iris signature bit pattern against stored signature bit patterns.

79. The product according to claim 76, wherein the act of segmenting iris images in the detected eye images comprises pattern matching according to iris and pupil models based on polarity-independent features.

80. The product according to claim 79, wherein the iris model is based on two opposing arc and the pupil model is based on a circle.

81. The product according to claim 79, wherein the act of pattern matching comprises:
   sub-sampling a first region based on the detected iris images;
   generating a first edge map based on the act of sub-sampling the first region;
   generating a list of first edge chains from the first edge map;
   generating a first search image by mapping edge points with appropriate orientations from the first edge chains;
   detecting an iris outer boundary by applying transformations of the iris model to the first search image;
   sub-sampling a second region based on the detected iris outer boundary;
   generating a second edge map based on the act of sub-sampling the second region;
   generating a list of second edge chains from the second edge map;
   generating a second search image by mapping edge points with appropriate orientations from the second edge chains; and
   detecting a pupil boundary by applying transformations of the pupil model to the second search image.

* * * * *